Figure 1:
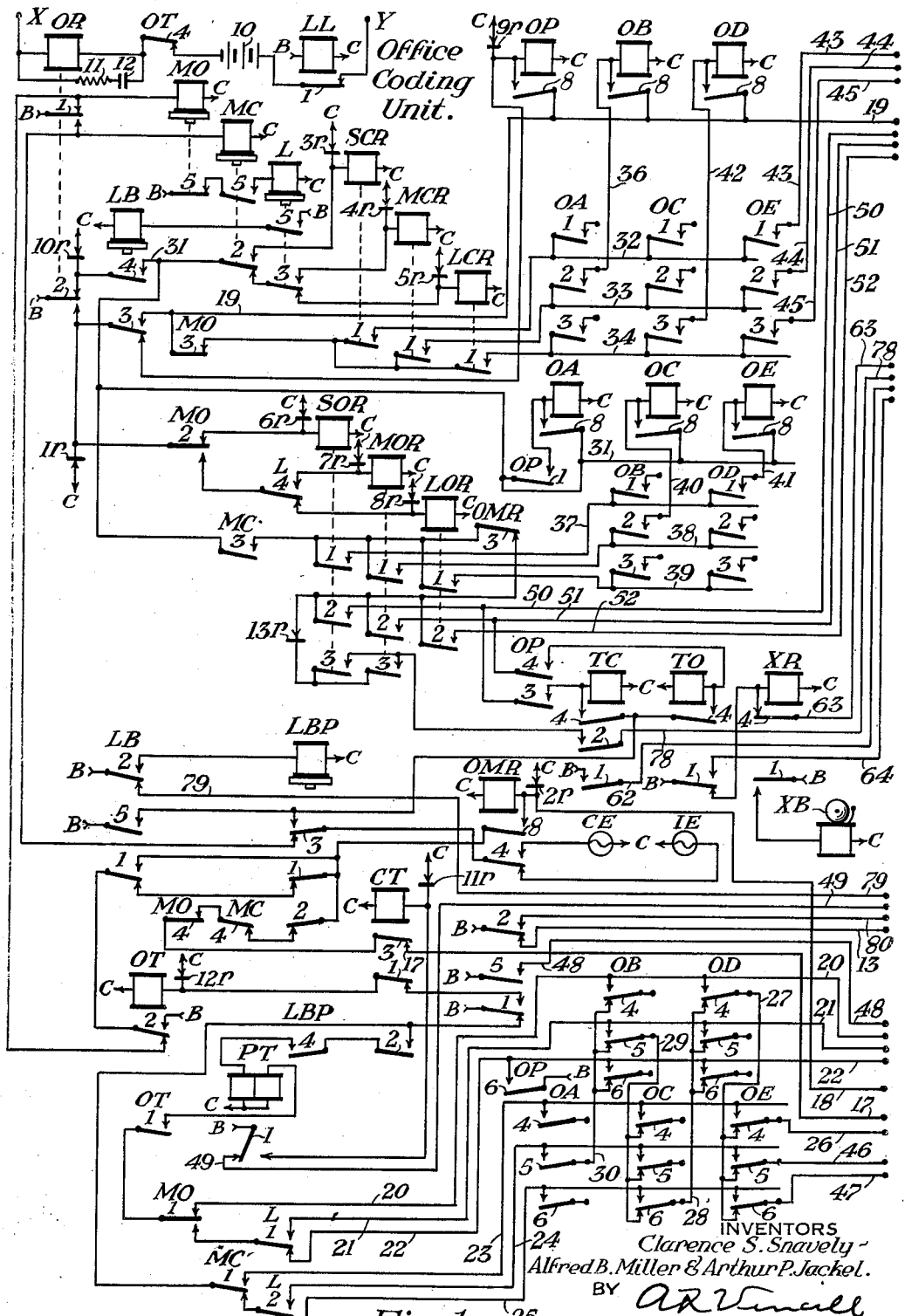

Dec. 12, 1939.  C. S. SNAVELY ET AL  2,183,155
REMOTE CONTROL SYSTEM
Filed July 16, 1935   5 Sheets-Sheet 1

INVENTORS
Clarence S. Snavely
Alfred B. Miller & Arthur P. Jackel.
BY
A. R. Vincell
THEIR ATTORNEY INVENTORS
Clarence S. Snavely -
Alfred B. Miller & Arthur P. Jackel.
BY
THEIR ATTORNEY Patented Dec. 12, 1939

2,183,155

UNITED STATES PATENT OFFICE 2,183,155

REMOTE CONTROL SYSTEM

Clarence S. Snavely, Swissvale, Alfred B. Miller, Edgewood, and Arthur P. Jackel, Swissvale, Pa., assignors to The Union Switch & Signal Company, Swissvale, Pa., a corporation of Pennsylvania Application July 16, 1935, Serial No. 31,592

88 Claims. (Cl. 246—5)

Our invention relates to remote control systems for the control from a central point of selected devices located at remote points, and also for indicating at the control point the condition of such devices and of other devices located at remote points. In its specific embodiment, our invention relates particularly to centralized traffic control systems for railroads, of the type in which a large number of railway signals and track switches at more or less widely spaced field stations are controlled from time to time from a dispatcher's office over a single line circuit, and in which the same line circuit is employed at other times to indicate at the dispatcher's office the positions assumed by the switches and signals, or to indicate traffic conditions at the same or at other field stations.

Our invention contemplates the use of code signals produced by interrupting a normally closed line circuit connecting the dispatcher's office and the several stations, and more specifically, employs a code in which the period of open circuit and closed circuit in the line are both varied so that both of these periods constitute code elements, as disclosed and claimed in a copending application of Lloyd V. Lewis, Serial No. 600,786, filed March 23, 1932, for Remote control systems.

One object of our invention is the provision of a system employing a code of time-spaced elements in which selected elements are prolonged for different time intervals, so that each code element may have one of at least three possible characters. For example, in the codes utilized by our apparatus as herein disclosed, each code element may be short, medium, or long, and our apparatus provides a large number of different codes while employing but one line circuit and a relatively small number of code elements, and in respect to this feature, our apparatus is an improvement upon that disclosed and claimed in the copending application of Snavely, Miller and Tunell, Serial No. 538,380, filed May 18, 1931, for Remote control systems.

Another object of our invention is to provide a line circuit which does not require the sectionalizing devices heretofore employed in systems of this character, and our apparatus functions in such a manner as to permit the control office to be located either at the end or at any desired intermediate point in the line circuit, the different codes being transmitted one at a time in the proper order even though two stations or the office and a station start to transmit at the same time.

Another object of our invention resides in the provision of means for electrically interlocking the apparatus for controlling the transmission of the different control codes from the dispatcher's office in such a manner as to insure the transmission of a series of codes for effecting a sequence of related operations in a predetermined order, and to also prevent the transmission of certain codes when the devices controlled by such codes are locked against operation.

Other objects and features of our invention will become apparent as the description proceeds.

We will describe several forms of the apparatus embodying our invention, and will then point out the novel features thereof in claims.

Figure 2:
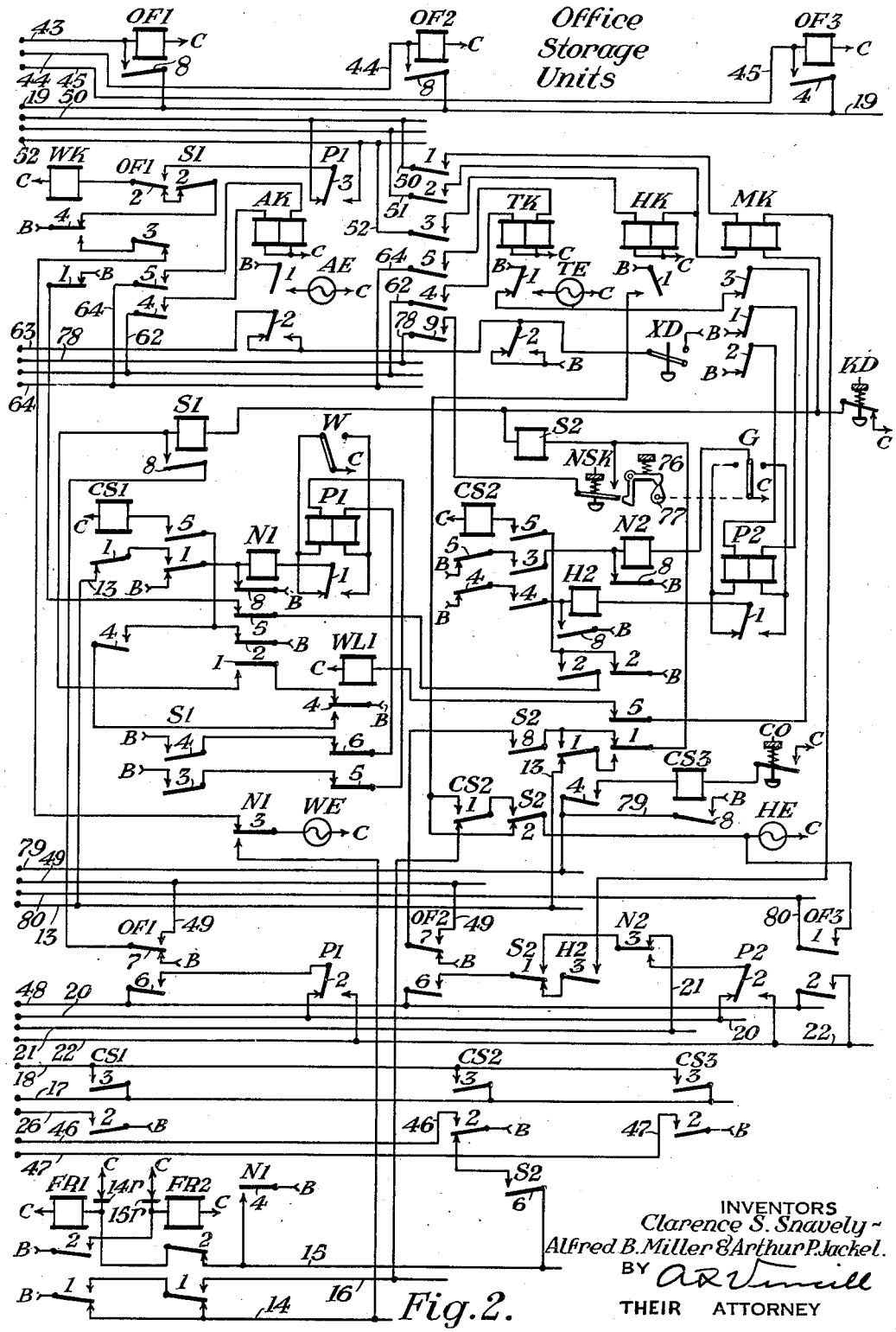
Figure 3:
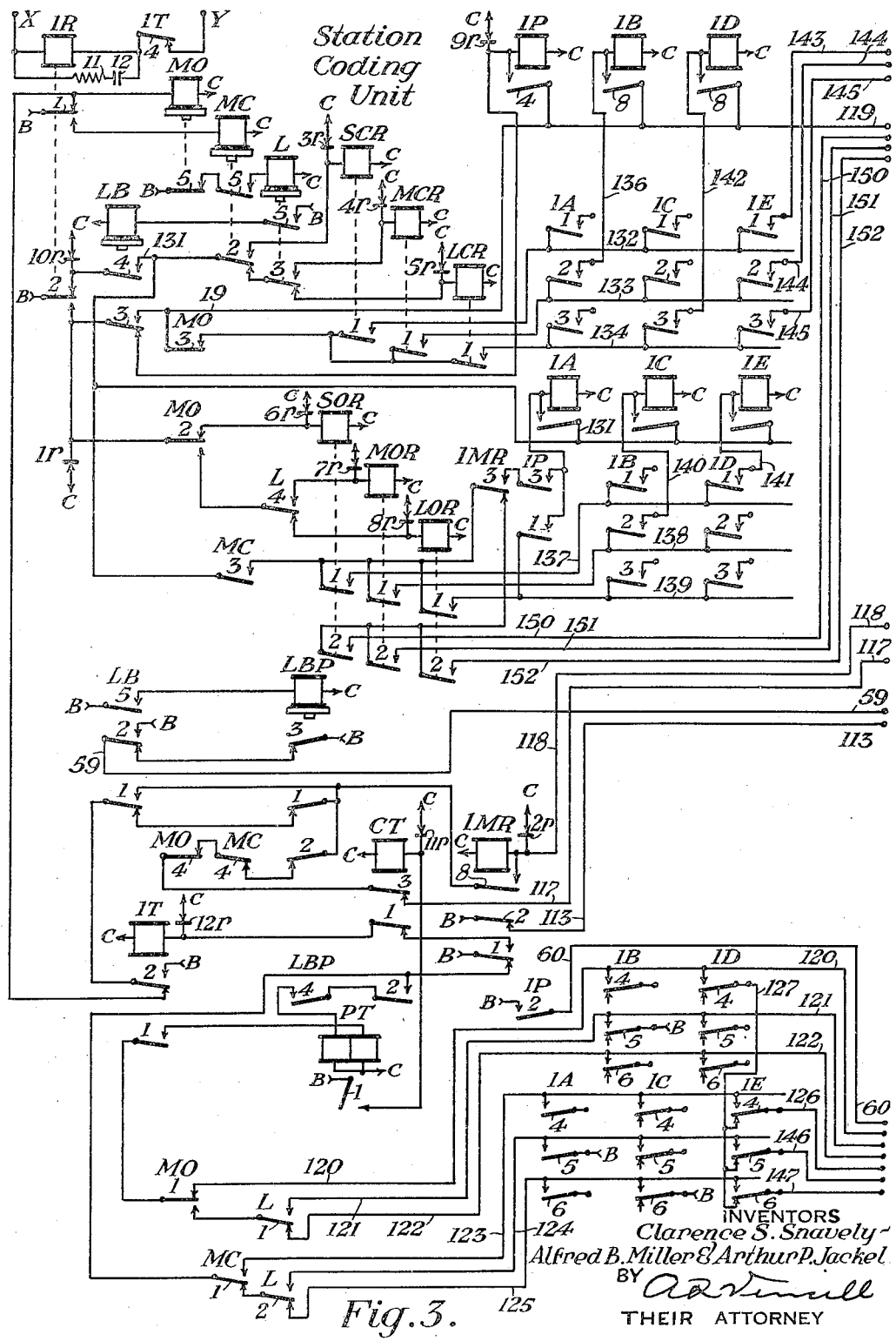
Figure 4:
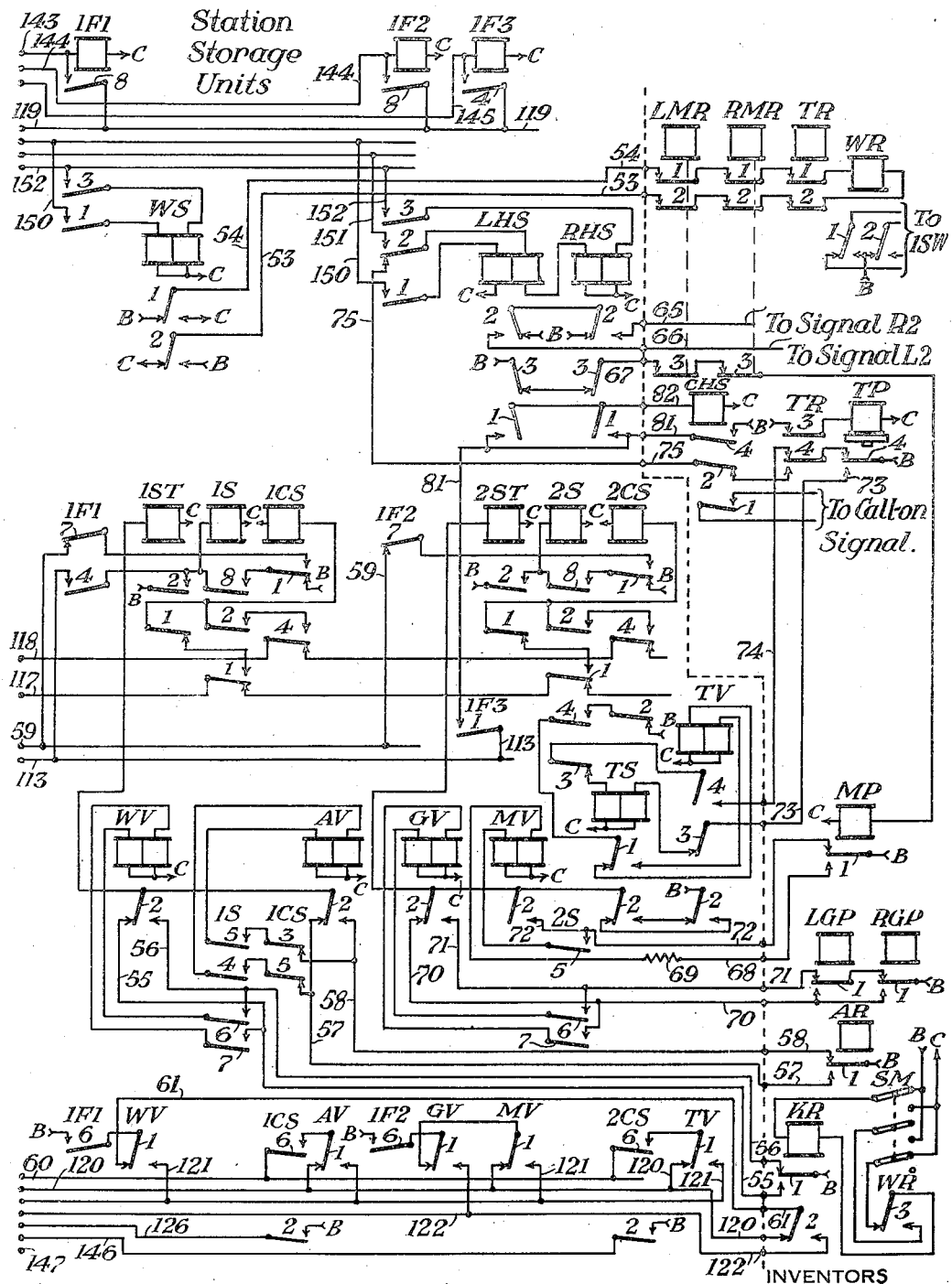
Figure 5:
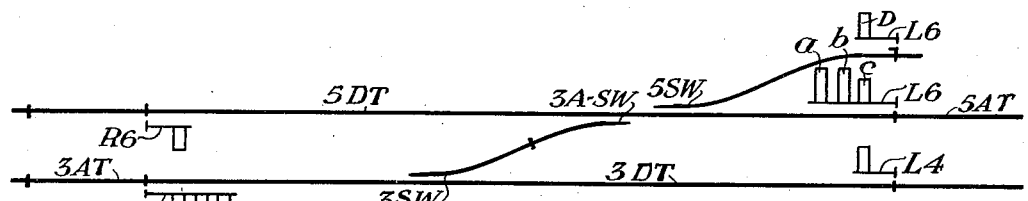
Figure 6:
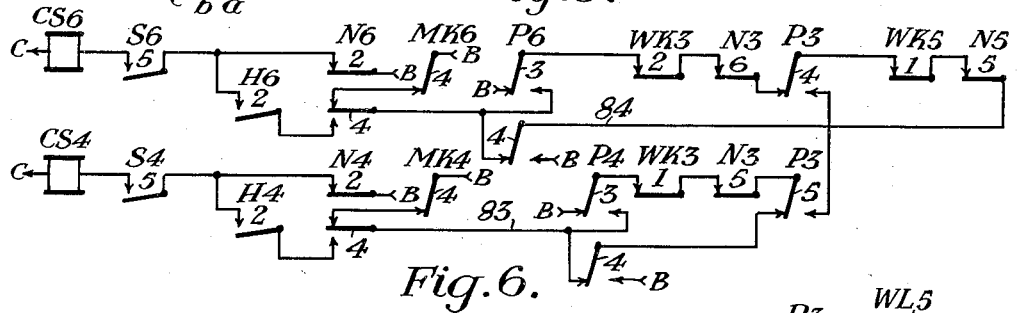
Figure 7:
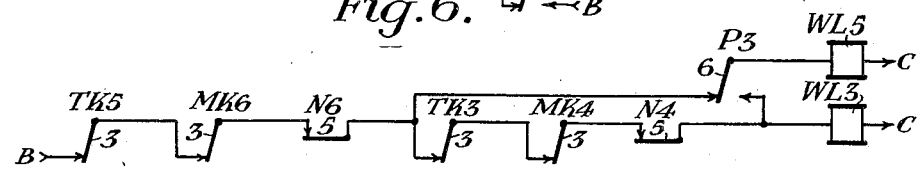
Figure 8:
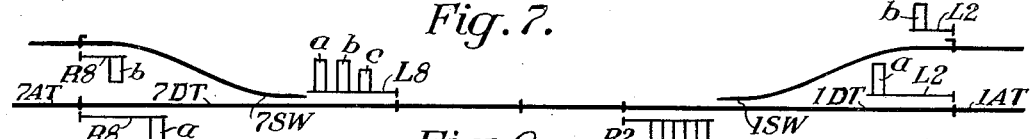
Figure 9:
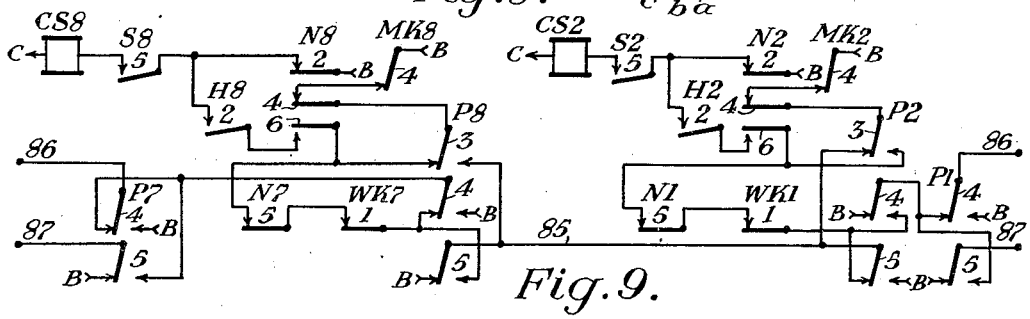
Figure 10:
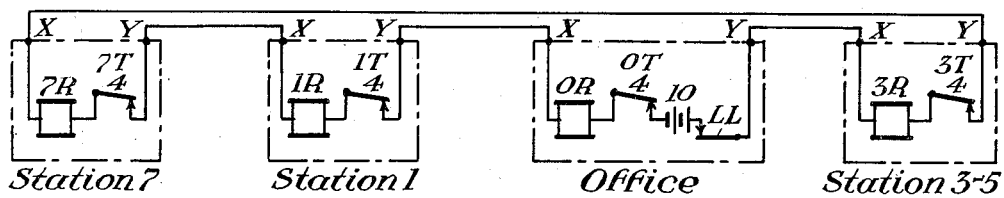

In the accompanying drawings, Figs. 1 to 4, inclusive, arranged side by side with Fig. 1 at the left, form a diagrammatic view illustrating in condensed form one arrangement of apparatus employed in a centralized traffic control system embodying our invention, while Figs. 5 to 10, inclusive, are auxiliary views which illustrate how our apparatus may be adapted to various situations. More particularly, Fig. 1, entitled "office coding unit," includes the dispatcher's office equipment for generating and delivering different codes to the line circuit of the system and for receiving and decoding the codes received over the line circuit from the field stations. Fig. 2, entitled 'office storage units" shows, at the left, an apparatus unit such as is used to control each track switch of the system and to indicate the condition of the track switch and of an adjacent track section. At the right, Fig. 2 shows a different apparatus unit such as is used to control a group of signals and to indicate condition of the signals and of an adjacent track section, this unit including an auxiliary unit for the control of a slow-speed or "call-on" signal. Fig. 3, entitled "station coding unit" includes the group of apparatus located at each station which corresponds in function to the office equipment of Fig. 1. Fig. 4 entitled "station storage units," shows the apparatus units located at each station which cooperate with the corresponding units of Fig. 2 to effect the control of the switch and signals at the stations and to govern the transmission of indications from the station. Fig. 5 is a track diagram showing the arrangement of the switches and signals in a typical small interlocking. Fig. 6 illustrates a modification of the signal lever circuits of Fig. 2 which serves to electrically interlock the signal levers when our apparatus is employed to control interlocked signals arranged as in Fig. 5. Fig. 7 illustrates a corresponding modification of the switch lever circuits of Fig. 2 which may be used when the switches of Fig. 5 are controlled by our apparatus. Fig. 8 is a track diagram showing a typical arrangement of switches and signals for governing the movement of traffic on a single track railroad. Fig. 9 illustrates a modification of the signal lever circuits of Fig. 2 which serves to interlock the signal lever circuits for the signals at adjoining stations when the signals are arranged as shown in Fig. 8. Fig. 10 shows the line circuit by which the apparatus of Figs. 1 and 3 is interconnected when the system is arranged to control the switches and signals of Figs. 5 and 8 from a centrally located office.

Similar reference characters refer to similar parts in each of the several views.

The line circuit employed in systems embodying our invention comprises a single control wire and a common return wire. Referring to Figs. 1 and 3, each coding unit has a pair of line terminals X and Y, and the line circuit is formed as indicated in Fig. 10, by connecting each terminal Y to the terminal X of another unit to form a closed circuit, a line battery 10 being included in the circuit at any convenient point. The line circuit is normally closed and includes at the office and at each station, a normally energized line relay designated by the reference R with a prefix identifying the location, and a back contact 4 of a similarly identified transmitter relay T. When any transmitter relay T is operated to deliver a code to the line circuit, the line relays R operate in unison and control the several operations involved in the generation of the line signals at the sending point and in the decoding of the line signals at the receiving point.

The line battery 10 is proportioned according to the number of stations and the length and resistance of the line wires, and while it is usually convenient to locate it at the office, as indicated, it may be sub-divided and portions located at different points in order to minimize the effect of line leakage and thereby increase the number of stations and extent of territory controlled. Sparking of the contacts in the line circuit is avoided by connecting across each relay R a resistor 11 and a condenser 12, in series, these parts being proportioned so as to absorb the inductive energy of the relay when the line circuit is opened.

In order to simplify our drawings and to avoid duplication of parts in different views, we have shown but one of each of the several units employed in systems embodying our invention, and the apparatus of Figs. 1 to 4, inclusive, taking but one copy of each sheet, forms a complete system arranged to control from a remote office a single switch such as switch 1SW of Fig. 8, and the opposing signals R2 and L2 for governing the movement of traffic in opposite directions over the switch. This system is also arranged to automatically indicate at the office the condition of the switch 1SW, of the signals L2 and R2, of a track section such as the section 1DT containing the switch, and of another track section such as the adjacent approach section 1AT.

For simplicity our apparatus will be explained with reference to this simple layout, and it will then be pointed out how the drawings may be expanded by a duplication of certain portions so as to illustrate each detail of more extensive systems including a plurality of stations and a plurality of interlocked switches and signals at a station.

Before proceeding with a detailed description of the circuits, however, we will briefly explain the general plan and organization of a typical centralized traffic control system embodying the apparatus of our invention.

As herein illustrated, in each code the line is opened and closed four times, each code including seven elements. The timing of the successive code elements is controlled by a group of slow-release timing relays MO, MC and L controlled by a line relay R. Relay MO is deenergized when the line is open and relay R is released, and measures the medium line-open code elements. Relay MC is deenergized when the line is closed and relay R is picked up, and measures the medium line-closed code elements, while relay L is a repeater of relays MO and MC and measures the long code elements. Relays R, MO and L, or relays R, MC and L, as the case may be, function in such a manner as to close a series of contacts one at a time at spaced intervals when the line relay remains in the corresponding position. These relays control two slow-release bridging relays LB and LBP which control various local circuits and also serve to space consecutive codes and to insure that a code will not be transmitted except when the line circuit is available. The timing relays alternately control two groups of register relays SOR, MOR, LOR and SCR, MCR, LCR to register the short, medium or long line-open or line-closed code elements respectively. A preliminary stepping relay, designated by the reference OP in Fig. 1 and by the reference 1P in Fig. 3, picks up when the line opens at the beginning of the code, and controls the first of a series of stepping relays similarly distinguished by the prefix O or 1 and bearing the references A, B, C, D, E and F. These relays are operated one at a time, each at the end of a different code element, but with the exception of relay A, only if such element has a particular one of the three possible characters. As illustrated, there are three relays F1, F2 and F3, one for each different character of the sixth element, each of which is adapted to control a selected three-position device in accordance with the character of the seventh element. When arranged with five selecting elements as herein illustrated, our apparatus therefore provides $3\times3\times3\times3\times3=243$ different codes for the control of three-position devices.

All of the apparatus so far described operates in unison at the office and station, both in sending control codes from the office to the station and in sending indication codes from the station to the office, but each coding unit includes a master relay MR, which is energized to cause the coding unit to function as a transmitter, and differentiates between the sending and receiving functions of the coding unit.

Each control code transmitted from the office to a station is differentiated from the corresponding indication code by the character of the first element, which is long in each control code and of different character in each indication code. At the beginning of the second element of each indication code a register relay TC or TO is picked up, depending upon whether the first element is short or medium, to register the condition of a track circuit at the station, each indication code thus being adapted to indicate the condition of one two-position and one three-position device.

When relay MR is energized, the transmitter relay T is operated repeatedly to generate the code under the control of an auxiliary relay CT and a polar relay PT, which relays are controlled by circuits governed by the timing and stepping relays. An individual code sending relay CS is provided for each code, which functions to pick up relay MR to initiate the code and to determine the character of the selecting elements. Each relay CS is controlled by an associated storing relay S. A knock-down key KD is provided by means of which the office relays CS and S may be released manually if due to some irregularity the coding unit is unable to complete a code.

As herein illustrated, the control code which selects the stepping relays OF1 and IF1 is employed to operate a switch control relay WS for governing the operation of the track switch, this code being transmitted in response to an operation of a two-position switch lever W at the office. A normally energized lever relay N1 releases to initiate the code whenever lever W is moved, the release of relay N1 causing a storing relay S1 to become energized to operate the corresponding code sending relay but only if conditions as reflected by the indication and signal control apparatus at the office are favorable for the operating of the switch, so that a lock relay WL1 is energized. The character of the seventh element of a switch control code is determined by a stick polar relay P1 which moves to a position corresponding to that of the switch lever when the lever is operated, but only if conditions are favorable for sending the code, and the code is transmitted only when lever W1 and relay P1 occupy corresponding positions.

The switch control relay WS controls a switch operating relay WR over circuits including contacts of approach locking relays LMR and RMR and of the track relay TR for the switch section. The circuits for the last-mentioned relays have been omitted to simplify the drawings, since they are not part of the present invention, but it is to be understood that they may be arranged, for example, as disclosed in the Kemmerer Patent No. 1,885,521, issued November 1, 1932, for Railway traffic controlling apparatus, so as to locally lock the switch against operation under unfavorable conditions irrespective of the condition of relay WS.

The condition of the switch is indicated at the office by a lamp WE associated with the lever. Lamp WE is normally dark but becomes lighted due to the release of a switch indication relay WK when a code is transmitted to operate the track switch or when the switch becomes unlocked or displaced due to conditions in the field, and is extinguished by the re-energization of that relay when an indication code is received, indicating that the switch is locked in a position corresponding to that of relay P1. Lamp WE displays a flashing indication when the lever is moved and relay P1 does not respond, indicating that the sending of the code is improper and that the lever should be returned to its original position. Indication relay AK is also controlled by the switch indication code and is operated to light the approach indication lamp AE whenever a code is received indicating that the corresponding approach section has become occupied.

As herein illustrated, the control code which selects the stepping relays OF2 and IF2 is employed to control a pair of stick polar signal control relays LHS and RHS for governing the signals L2 and R2, and is transmitted in response to the operation of a three-position signal lever G. When this lever is moved to its mid-position, a lever relay H2 is released to energize a storing relay S2, and then a lever relay N2 and a code sending relay CS2 become energized to effect the transmission of a code to put the signals to stop. There is no restriction upon the transmission of this code which may be initiated at any time to be transmitted as soon as the line circuit becomes available. If lever G is moved to the left or right, relay N2 releases, to initiate a code to clear either signal L2 or R2 depending upon the position of a stick polar relay P2 associated with the lever, but only if conditions are favorable for clearing the signal, the code sending relay CS2 becoming energized only when the circuits are conditioned to indicate that the switch is locked in a position corresponding to that of its control lever W, and lever G and relay P2 occupy corresponding positions. Relay P2 is arranged so that it responds to a reversal of lever G only if the contacts of an indication relay MK are closed. Relay MK is operated to open its contacts when a signal clear code is transmitted, and to close its contacts upon receipt of an indication code from the station indicating that the signals have been put to stop and that the approach locking relays governed by the signals have become energized. These various arrangements serve to prevent the sending of a code to clear a signal unless the route governed by the signal has been aligned, the opposing signal has been put to stop, and the approach locking associated with that signal is released. Furthermore, a signal when cleared can not be interfered with by attempting to transmit conflicting codes.

Another feature of our apparatus resides in the provision of an auxiliary key NSK associated with lever G. In normal operation, the signal control relays are operated automatically when a train enters the switch section so as to cause the signal to remain at stop after the train leaves the section, but if a signal is cleared and key NSK has been operated a "signal clear" control code will be initiated automatically upon receipt of a code indicating that a train has vacated the switch section, so that the signal will clear again for a following train, as explained hereinafter in detail.

The condition of the signals is indicated by a lamp HE associated with lever G. Lamp HE is normally dark but becomes lighted by the operation of an indication relay HK in response to an indication code initiated by the release of a signal repeating relay LGP or RGP at the station, which relays may be controlled as disclosed in the above-mentioned Kemmerer patent, each releasing when the corresponding signal is cleared. Lamp HE displays a flashing indication when the lever is operated and code-sending relay CS2 fails to become energized, indicating that the clearing of the signal is improper and can not be effected.

The flashing indications of lamps HE and WE are controlled by a pair of flasher relays FR1 and FR2 which operate alternately whenever a flashing indication is to be displayed. Indication relay TK is also controlled by the signal indication code and is operated to light lamp TE whenever a code is received indicating that the switch section is occupied.

Our indication apparatus also includes an audible warning signal comprising a bell XB controlled by a bell relay XR having circuits arranged in a novel manner to provide single stroke operation of the bell whenever the approach section becomes occupied, and also, under the control of a manually operable cut-out key XD, when the switch section becomes occupied.

The third code herein illustrated, namely, that which selects the stepping relays OF3 and IF3, is employed for the purpose of clearing an auxiliary slow speed or "call-on" signal such as arm c of signal R2, in the event a code has been transmitted to clear arm a or arm b, and the signal is prevented from clearing by traffic conditions. This code is initiated by picking up a code sending relay CS3 by the operation of a spring return key CO associated with lever G. Relay IF3 controls a call-on signal relay CHS at the station, governing arm c of the signal for the established direction of traffic.

At the field station, the different devices govern the transmission of indication codes in a generally similar manner, the codes being initiated automatically by the successive energization of a starting relay such as IST or 2ST and a storing relay IS or 2S when one or another of the indicating devices changes its position. The switch indication code is also initiated by the energization of relay IS when a control code is received at the station, so that irrespective of whether the switch is operated or not, each switch control code is followed by a return indication. The character of the selecting elements of the indication codes is determined by the relays CS, while that of the indicating elements is determined by stick polar relays WV, AV, GV, MV and TV which reflect the condition of the various indicating devices. Thus relays WV and AV are controlled respectively by the switch indication relay KR controlled by the switch and by the track relay AR for an adjacent approach section such as section IAT of Fig. 8. Relay GV is controlled by the signal indication relays LGP and RGP. Relay MV is controlled by a repeating relay MP which indicates the condition of the signal control relays and of the approach locking relays. Relay TV is controlled by an indication storing relay TS which in turn is controlled by a repeater relay TP of the track relay TR for a track section such as the switch section IDT of Fig. 8, the circuits being so arranged that in the event the switch section becomes occupied and vacated while the line is in use, the "track occupied" indication will be stored until the line becomes available for its transmission.

As will be apparent from the foregoing, our apparatus consists principally of an assembly of interconnected relays. Most of the relays are quick-acting, but in a number of instances the relay circuits include asymmetric units designated by the reference r with numerical prefix, each of which is arranged in the circuit so as to provide a high resistance to the flow of current from the power source while providing a low resistance discharge path to permit the gradual discharge of the stored inductive energy of the relay or relays when the power source is disconnected so that no sparking occurs when the controlling contacts are opened. The release of these relays is thereby delayed somewhat, but the parts are so proportioned that their release period is much shorter than that of those relays indicated conventionally as slow-release relays on the drawings. The latter slow-release relays are all alike, and are constructed so as to open their front contacts at the end of a constant time period after the circuit is opened, under a wide variety of operating conditions. The stick polar relays herein disclosed each have two windings, and it is to be understood that each is arranged to move its contacts to the right when the right-hand winding is energized and to the left when the left-hand winding is energized, and that the contacts are held positively in the last-operated position when the relay is deenergized.

A local direct current power source is provided at each location, but for simplicity these have been omitted and we have shown only the terminals of the sources and have designated these by the references B and C to indicate the power supply and common return terminals, respectively, of the sources. In some installations, rectified alternating current without a battery reserve is employed as the local power source, and since such a source may be subject to temporary interruption our apparatus is arranged so as to minimize the effect of such interruptions. To this end a relay LL is connected directly across terminals B and C of the local source and a front contact 1 of this relay is included in the line circuit, so that in the event of a failure of the local source, relay LL will release and open the line circuit, and the transmission of codes will be suspended until the local power is restored.

We will now describe, in detail, the various operations involved in reversing switch ISW and in clearing arm b of signal R2 by code. Assuming the apparatus to be in the condition shown in the drawings, it will be noted that in the coding units of Figs. 1 and 3, all of the relays are deenergized except the line relays R, the slow release relay MO, relay LL and the bell relay XR. The circuit for relay MO may be traced from terminal B, front contact 1 of relay OR, relay MO to the other terminal C of the source. In Fig. 2, the switch indication relay WK is energized over a stick circuit which may be traced from terminal B, front contact 4 of relay WK, back contacts 2 of relays S1 and OF1, relay WK to terminal C. The lever relays N1 and N2 are also energized over their stick circuits, the stick circuit of relay N1 extending from terminal B, front contact 8 and winding of relay N1, left-hand contact 1 of relay P1, left-hand or normal contact of switch lever W to terminal C, and that for relay N2 from terminal B, front contact 8 and winding of relay N2, middle contact of signal lever G to terminal C. The lock relay WL1 is also energized because the conditions are now assumed to be favorable for the operation of the switch and its circuit may be traced from terminal B, left-hand contact 1 of relay TK, left-hand contact 3 of relay MK, front contact 5 of relay N2, relay WL1 to terminal C. It is to be understood that relay TK has closed its left-hand contact because the switch section is unoccupied and that indication relay MK occupies a similar position because the signals governing traffic over the switch have been put to stop and the approach locking associated with these signals has been released. It is clear that since the circuit for relay WL1 includes front contact 5 of relay N2, relay WL1 will be energized only as long as signal lever G remains in its normal or stop position.

If the operator now reverses switch lever W, the circuit for relay N1 will be opened, causing this relay to release to complete a pickup circuit for storing relay S1 which may be traced from terminal B, front contact 4 of relay WL1, back contact 1 of relay N1, storing relay S1, knockdown key KD to terminal C. Relay S1, therefore becomes energized and upon picking up completes its stick circuit from terminal B, back contact 7 of relay OF1, front contact 8 and winding of relay S1, key KD to terminal C. Relay P1 now reverses, a circuit being closed from terminal B, front contact 4 of relay S1, front contact 6 of relay WL1, right-hand winding of relay P1, right-hand contact of lever W to terminal C. When relay P1 closes its right-hand contacts, a pickup circuit for reenergizing relay N1 is completed, provided master relay OMR is deenergized, which circuit may be traced from terminal B, back contact 2 of relay OMR, wire 13, back contact 1 of code-sending relay CS1, front contact 1 of relay S1, relay N1, right-hand contact 1 of relay P1, and the reverse contact of lever W to terminal C. Relay N1, upon picking up, establishes a stick circuit including its front contact 8 and the right-hand contacts of relay P1 and lever W, and so will remain energized until lever W is again operated. A pickup circuit for relay CS1 is now completed and may be traced from terminal B, front contact 2 of relay N1, front contact 5 of relay S1, relay CS1 to terminal C. When relay N1 released, lamp WE became lighted over a circuit from terminal B, back contact 1 of flasher relay FR1, bus wire 14, back contact 3 of relay N1, lamp WE to terminal C, and a circuit was closed from terminal B, back contact 4 of relay N1, bus wire 15, back contact 2 of relay FR2, relay FR1 to terminal C so that relay FR1 picks up to open the lamp circuit and to close a circuit from terminal B over its front contact 2 to energize relay FR2. When the latter relay picks up, the circuit for relay FR1 becomes open and it releases under the control of asymmetric unit 14r and opens the circuit for relay FR2, which then releases under the control of asymmetric unit 15r and again closes the circuit for relay FR1. Relays FR1 and FR2 thus pick up and release alternately whenever bus wire 15 is energized to supply current intermittently to bus wires 14 and 16. Lamp WE will thus flash intermittently as long as relay N1 is released, but this will be but momentary in the case described, because relay S1 picks up immediately to effect the re-energization of relay N1. If, however, relay S1 should fail to pick up, the flashing indication of lamp WE would persist. In this event the flashing indication may be canceled by restoring lever W to its original position to complete a circuit from terminal B, back contact 1 of relay S1, relay N1, left-hand contacts of relay P1 and lever W to terminal C, to re-energize relay N1. However, in the case described, lamp WE will be lighted steadily because when relay S1 picks up, the opening of its back contact 2 releases indication relay WK, and as soon as relay N1 picks up, a circuit for lamp WE is closed from terminal B, back contact 4 of relay WK, back contact 3 of relay OF1, front contact 3 of relay N1, lamp WE to terminal C. Lamp WE now remains steadily lighted until an indication code is received to reenergize relay WK, or until lever W1 is again operated to release relay N1.

If the line circuit is closed and the apparatus is in condition to transmit a code, the energization of relay CS1 as described will complete a pickup circuit for relay OMR which may be traced from terminal B, front contact 1 of relay OR, back contact 2 of relay OT, back contact 1 of relay LB, back contacts 1 and 2 of relay LBP, contacts 4 of relays MC and MO, contact 3 of relay CT, wire 17, contact 3 of relay CS1, wire 18, relay OMR to terminal C. Relay OMR picks up and completes one branch of its stick circuit which may be traced from terminal B, front contact 1 of relay OR, back contact 2 of relay OT, back contacts 1 of relays LB and LBP, contact 8 and winding of relay OMR to terminal C. When relay OMR picks up, a circuit for relay OT is closed from terminal B, front contact 1 of relay OMR, back contact 1 of relay CT, relay OT to terminal C so that relay OT picks up, opening its back contact 4 in the line circuit and releasing relays OR and IR. Relay OMR remains picked up, because its stick circuit is now closed from terminal B, over front contact 2 of relay OT, back contacts 1 of relays LB and LBP, contact 8 and winding of relay OMR to terminal C. Relay OR upon releasing completes a circuit from terminal B over its back contact 1, relay MC to terminal C so that relay MC picks up and completes a circuit from terminal B, front contacts 5 of relays MO and MC, relay L to terminal C. Relay L picks up and closes its front contact 5 to complete a circuit for relay LB, which picks up and the closing of front contact 2 of relay LB completes a circuit for relay LBP which picks up. The pickup circuit of relay OMR has been opened momentarily, but asymmetric unit 2r in multiple with this relay insures that relay OMR remains picked up until its stick circuit is completed over front contact 1 of relay LB to again energize relay OMR.

When relay OR released, a circuit was closed momentarily from terminal B, back contact 2 of relay OR, back contact 3 of relay LB, relay OP to terminal C so that relay OP picks up and a stick circuit for relay OP was closed when relay LB picked up which may be traced from back contact 2 of relay OR, front contact 3 of relay LB, bus wire 19, contact 8 and winding of relay OP to terminal C. When relay OR released, a circuit was closed from terminal B, back contact 1 of relay OR, back contact 3 of relay LBP, front contact 4 of relay OMR, lamp CE to terminal C, so that lamp CE becomes lighted. When relay LBP picks up, lamp CE is energized over a circuit from terminal B, front contact 5 of relay LB, front contact 3 of relay LBP, contact 4 of relay OMR, lamp CE to terminal C, so that lamp CE remains steadily lighted for the duration of a control code. Lamp IE is controlled in a similar manner over back contact 3 of relay OMR, and remains steadily lighted for the duration of an indication code. Lamp IE also becomes lighted in the event of a failure of the line circuit, and these lamps serve to inform the operator of any irregularity in the operation of the coding apparatus.

When relay OR released, relay MO became deenergized, but before it releases a circuit is closed from terminal B, back contact 2 of relay OR, front contact 2 of relay MO, register relay SOR to terminal C so that relay SOR picks up to prepare circuits for registering a short code element. The first element of a control code, however, is not a short element and the apparatus remains in the condition just described until relay MO releases, closing a circuit from terminal B, back contacts 2 of relays OR and MO, front contact 4 of relay L, relay MOR to terminal C, to pick up relay MOR to prepare circuits for registering a medium code element. Relay SOR is now disconnected from the source of energy and releases as soon as its stored inductive energy discharges through asymmetric unit 6r. Relay L is deenergized by the release of relay MO and when it releases the energizing circuit for relay MOR is opened and this relay releases under the control of asymmetric unit 7r. A circuit is now completed over back contact 4 of relay L to pick up relay LOR which is controlled by asymmetric unit 8r to prepare circuits for registering a long code element. Thus, when the line remains open, relays SOR, MOR and LOR are operated consecutively to prepare circuits over their contacts 1 and 2 to register the character of the element when it is terminated. Each line-open code element is terminated by operating relay PT to the right by the closing of a circuit over one of the bus wires 20, 21 or 22 which are connected to relay PT one at a time in turn by the operation of contacts 1 of relays MO and L. Thus, the first element of a control code is terminated by the closing of a circuit from terminal B, front contact 6 of relay OP, wire 22, back contacts 1 of relays L and MO, contact 1 of relay OT, right-hand winding of relay PT to terminal C. Relay PT thereupon closes its right-hand contact 1 to complete an obvious circuit for relay CT which picks up, opening the circuit of relay OT, which releases under the control of asymmetric unit 12r to again close its contact 6 in the line.

When the line closes to begin the second element, relay OR picks up, closing its front contact 1 to reenergize relay MO, and relay MO closes its contact 5 to reenergize relay L. The latter relay in turn closes its contact 5 to reenergize relay LB. The circuit for relay LB has been open but a short time and this relay does not release but remains picked up for the duration of the code.

When relay OR picked up, the energizing circuits for relays LOR and OP were opened, but these relays remain picked up for a short time because of the associated asymmetric units 1r, 8r and 9r so that a pickup circuit for relay OA is closed momentarily from terminal B, front contact 2 of relay OR, front contact 4 of relay LB, bus wire 31, front contact 1 of relay OP, relay OA to terminal C. Relay OA picks up, closing its stick circuit from terminal B, front contact 2 of relay OR, front contact 4 of relay LB, wire 31, front contact 8 and winding of relay OA to terminal C.

When relay OR picked up, a circuit was closed from terminal B, front contact 2 of relay OR, front contact 4 of relay LB, front contact 2 of relay MC, relay SCR to terminal C and relay SCR picks up to prepare a circuit for registering a short line-closed element. Relay MC is now deenergized and when it releases it opens the circuit for relay SCR to cause this relay to release under the control of asymmetric unit 3r and completes a branch of the circuit just traced over its back contact 2, front contact 3 of relay L, relay MCR to terminal C, to pick up relay MCR to prepare a circuit for registering a medium line-closed element. Relay MC also opens the circuit of relay L, and if relay OR remains energized, relay L will release at the end of its time period opening the circuit for relay MCR to cause this relay to release under the control of asymmetric unit 4r, relay L closing its back contact 3 to complete a branch of the circuit just traced for energizing relay LCR to prepare a circuit for registering a long line-closed element. Thus, when the line remains closed, relays SCR, MCR and LCR are operated consecutively to prepare circuits including their contacts 1 to register the character of the element when it is terminated. Each line closed element is terminated by operating relay PT to the left by the closing of a circuit over one of the bus wires 23, 24 or 25 which are connected to relay PT one at a time by the operation of contact 1 of relay MC and contact 2 of relay L. In the case illustrated the second element is a medium element, and relay OR remains energized until relay MC releases and closes its back contact 1 to complete a circuit from terminal B, front contact 2 of the code-sending relay CS1, wire 26, back contact 4 of relay OE, jumper wire 27, back contact 4 of relay OD, jumper wire 28, back contact 5 of relay OC, jumper wire 29, back contact 5 of relay OB, jumper wire 30, front contact 5 of relay OA, bus wire 24, front contact 2 of relay L, back contact 1 of relay MC, front contact 2 of relay CT, front contact 4 of relay LBP, left-hand winding of relay PT, to terminal C so that when relay MC releases, relay PT operates its contact to the left to deenergize relay CT. Relay CT releases in a short time under the control of asymmetric unit 11r and closes its back contact 1 to complete the circuit for relay OT, which picks up to open the line, thereby terminating the element.

When the line opens at the beginning of the third element, and likewise at the beginning of each succeeding odd-numbered element, relay OR releases and re-energizes relays MC and L and also completes a connection from terminal B over its back contact 2, front contacts 3 of relays LB and MO, front contact 1 of the register relay SCR, MCR or LCR that is picked up at the time, to energize bus wire 32, 33, or 34, depending upon whether the element just terminated was short, medium or long. The register relay remains picked up for a short time because of the asymmetric unit 3r, 4r or 5r connected across its winding, and the stepping relay last energized also remains picked up for a short time because asymmetric unit 10r is now connected to the relay over wire 31. Wires 32, 33 and 34 are connected to contacts 1, 2 and 3 respectively of each of the stepping relays, and a jumper such as wire 36 provides an adjustable connection to one of these three contacts for energizing the next stepping relay of the series. In the case illustrated, the second element of the code is medium, relay OR releasing when relay MCR is picked up, and wire 36 is connected to contact 2 of relay OA so that when relay OR releases, bus wire 33 is energized momentarily to complete a circuit over contact 2 of relay OA, wire 36, relay OB to terminal C. Relay OB picks up and completes its stick circuit including its contact 8 and wire 19, this circuit being similar to that described for relay OP, and then relays MCR and OA release.

The timing and line-open register relays now operate in the same manner as in the case of the first element, but wire 29 now completes a connection over front contact 5 of relay OB to wire 21 so that relay PT will be operated to the right when relay MO releases and the third element will be medium.

When the line closes at the beginning of the fourth element, and likewise at the beginning of the sixth element, relay OR picks up and re-energizes relays MO and L and also completes a connection from terminal B over its front contact 2, front contact 4 of relay LB, front contact 3 of relay MC, front contact 1 of the register relay SOR, MOR or LOR that is picked up at the time to energize wire 37, 38 or 39. The stepping and register relays last energized remain picked up for a short time because of asymmetric units 1r and 6r, 7r or 8r, and jumper wires 40 and 41 provide adjustable connections over contacts 1, 2 or 3 of the stepping relays for energizing the next stepping relay of the series. The third element being medium in the case illustrated, relay OR picks up when relay MOR is picked up and wire 40 is connected to contact 2 of relay OB to effect the energization of relay OC which thus picks up at the beginning of the fourth element and establishes a stick circuit over wire 31 which is like that of relay OA and then relays MOR and OB release.

In the case illustrated, wire 28 is connected to contact 6 of relay OC and completes a connection to wire 25 when relay OC picks up to operate relay PT to the left when relay L releases, so that the fourth element is long.

When the line opens at the beginning of the fifth element, relay LCR is energized, and relay OD picks up by reason of the connection of jumper 42 to contact 3 of relay OC, and completes its stick circuit over wire 19 and then relays LCR and OC release. Relay OD connects wire 27 over its front contact 4 to wire 29 so that relay PT is operated to the right as soon as relay OD picks up and the fifth element is short.

When the line closes at the beginning of the sixth element, relay SOR is energized, and relay OE picks up by reason of the connection of jumper 41 to contact 1 of relay OD, and its contacts 1, 2 and 3 connect wires 32, 33 and 34 to wires 43, 44 and 45 leading to relays OF1, OF2, and OF3, respectively, and completes its stick circuit over wire 31, and then relays SOR and OD release. Contacts 4, 5 and 6 of relay OE now connect wires 26, 46 and 47 leading to contacts 2 of relays CS1, CS2 and CS3, to wires 23, 24 and 25, respectively. Relay CS1 being energized, relay PT will be operated to the left by the closing of the circuit over contact 4 of relay OE as soon as relay OE picks up, so that the sixth element will be short. It is to be noted, however, that two or more of the relays CS may be energized at the same time without interference, because if a circuit is completed over contact 4 of relay OE, relay PT will be operated to the left as soon as relay OE picks up, releasing relay CT to open the circuits prepared over contacts 5 and 6 of relay OE. The codes governed by relays CS2 and CS3 in this instance will be stored, and since the circuit including contact 5 of relay OE similarly takes precedence over the one including contact 6, these codes will be transmitted one at a time in order after the code governed by relay CS1 is completed.

In the code illustrated, therefore, the sixth element is short, and when the line opens to begin the seventh element, relay SCR is energized, and a circuit is completed over wires 32 and 43 to energize relay OF1 which picks up and establishes its stick circuit over wire 19 and then relays SCR and OE release.

The character of the seventh element of the switch control code is determined by the position of relay P1, and is short or long, depending upon whether the switch is to be operated to normal or reverse. Relay P1 having been operated to the right to reverse the switch, a circuit is completed from terminal B, front contact 5 of relay OMR, wire 48, front contact 6 of relay OF1, right-hand contact 2 of relay P1, wire 22, back contacts 1 of relays L and MO, contact 1 of relay OT, right-hand winding of relay PT to terminal C to operate relay PT to the right when relay L releases. The circuit for producing a short seventh element to operate the switch to normal differs from the circuit just traced in that it includes the left-hand contact 2 of relay P1, wire 20, and front contact 1 of relay MO, and it closes to operate relay PT to the right as soon as relay OF1 picks up. When relay OF1 picked up, the closing of its front contact 7 established a new holding circuit for relay S1 which may be traced from terminal B, left-hand contact 1 of relay PT, wire 49, front contact 7 of relay OF1, contact 8 and winding of relay S1, key KD to terminal C. Relay PT is operated to the right to terminate the seventh element before relay OF1 releases, and when this circuit is opened, relay S1 releases, and opens its contact 5 to release relay CS1.

When relay OR picks up at the end of the seventh element, relay LOR is energized and relays MO and L pick up. The line circuit remains steadily closed, and relays OF1 and LOR, MC, L, LB and LBP release in sequence. The opening of front contact 1 of relay LB causes relay OMR to release, completing a circuit for relay PT which may be traced from terminal B, back contact 1 of relay OMR, front contact 2 of relay CT, front contact 4 of relay LBP, left-hand winding of relay PT to terminal C, operating relay PT to the left to release relay CT. This completes the transmission of the switch control code and the apparatus of Fig. 1 is now restored to the condition shown in the drawings. When relay LB releases, relay OP is again connected to back contact 2 of relay OR and the coding unit is in condition to receive a new code. When relay LBP releases, the pickup circuit of relay OMR is again connected to front contact 1 of relay OR and the apparatus is in condition to transmit another code. The apparatus of Fig. 2 is now also restored to the condition shown in the drawings except that lever W and relay P1 have been operated to the right, relay WK is released, and lamp WE is lighted.

Considering now the station apparatus of Figs. 3 and 4, it is to be understood that the slow-release relays, the register relays and the stepping relays controlled by relay IR have been controlled over circuits similar to those already described and have operated in unison with the corresponding relays at the office so that relays IP, IA, IB, IC, ID, IE and IF1 have each been energized in turn. For convenience in comparing the circuits, the numbered wires in Figs. 3 and 4 which are a counterpart of corresponding wires in Figs. 1 and 2 are designated by similar references but with a prefix 1 added, thus for example, relay IF1 is energized over a circuit including wire 143 when relay OF1 is energized over wire 43. Relay IMR at the station, however, is not energized when receiving and the associated transmitter relays IT, CT and PT at the station have not been operated.

The seventh element of each code is registered by circuits closed only when the coding unit functions as a receiver. Thus when relay IR picks up at the end of a control code, relay IMR is not energized and a connection is established from terminal B, front contact 2 of relay IR, front contact 4 of relay LB, front contact 3 of relay MC, back contact 3 of relay IMR, front contact 2 of relay SOR, MOR, or LOR to wire 150, 151 or 152.

The seventh element of the switch control code described being long, relay LOR at the station is energized when relay IR picks up at the end of the code and the register circuit is completed from wire 152, over front contact 3 of relay IF1, right-hand winding of relay WS to terminal C, so that relay WS will be operated to close its contacts to the right. Assuming that track relay TR for the switch section is energized, the signals governing traffic over the switch are at stop, and that the approach locking relays LMR and RMR controlled by these signals are energized, a circuit will be completed from terminal B, right-hand contact 2 of relay WS, wire 53, front contacts 2 of relays LMR, RMR and TR, polar switch operating relay WR, front contacts 1 of relays TR, LMR and RMR, wire 54, right-hand contact 1 of relay WS to terminal C so that relay WR will close its right-hand contacts to complete circuits for energizing the motor of the switch machine to operate the track switch to reverse. When the seventh element of the switch control code is short, relay WS is operated to the left by a similar circuit including front contact 2 of relay SOR, wire 150 and contact 1 of relay 1F1, and relay WR is operated to the left to restore the switch to normal.

Each switch control code also operates the storage relay 1S to initiate the transmission of an indication code. When relay 1F1 picks up, a circuit is closed from terminal B, back contact 2 of relay 1MR, wire 113, front contact 4 of relay 1F1, relay 1S to terminal C. Relay 1S picks up, closing its stick circuit from terminal B, back contact 1 of relay 1CS, front contact 3 and winding of relay 1S to terminal C. Relay 1S remains energized, storing the code if the line is not available for transmission.

The switch machine for switch 1SM is provided with the customary circuit controller contacts indicated by the reference SM in Fig. 4 for controlling the polar switch indication relay KR. These contacts operate to cause relay KR to become deenergized as soon as relay WR is operated to a position out of correspondence with that of the switch or when the switch is unlocked, and to become energized in the reverse direction when the switch completes its operation and is locked reverse, as illustrated in the Kemmerer patent hereinbefore referred to. When relay 1S becomes energized, the polar relay WV is operated to a position corresponding to the condition of relay KR. Thus, when relay KR releases due to the reversal of contact 3 of relay WR, relay 1S having been energized as above-described, a circuit is closed from terminal B, back contact 1 of relay KR, wire 55, front contact 7 of relay 1S, right-hand winding of relay WV to terminal C. Relay WV closes its right-hand contact 1 to cause the seventh element of the indication code to be medium to indicate the unlocked condition of the switch.

The switch indication code is also at times initiated automatically, in the event relay KR becomes released due to conditions in the field, as would be the case, for example, if the switch points become displaced so that the circuit controller contacts SM become open. In this case relay 1S is energized in the following manner: When relay KR releases, a circuit is closed from terminal B, back contact 1 of relay KR, wire 55, left-hand contact 2 of relay WV, starting relay 1ST to terminal C. Relay 1ST picks up and closes a circuit from terminal B over its front contact 2, relay 1S to terminal C. Relay 1S then picks up, closing its stick circuit and completing the circuit to cause relay WV to close its right-hand contacts as already described, relay 1ST again releasing when the left-hand contact 2 of relay WV opens. A switch indication code is also initiated when relay KR picks up, as for example, when the switch completes its movement to a position corresponding to that of relay WR, the circuit for relay 1ST in this case including front contact 1 of relay KR, wire 56 and the right-hand contact 2 of relay WV, the latter relay being operated to the left to release relay 1ST as soon as relay 1S picks up to close its contact 6. In this code, the character of the seventh element is determined by the position of contact 2 of relay KR and is short if the switch is locked normal and long when it is locked reverse.

The switch indication code includes an indication of the condition of the approach section, and is initiated automatically whenever relay AR picks up or releases. When relay AR releases, a circuit is closed from terminal B, back contact 1 of relay AR, wire 57, left-hand contact 2 of relay AV, relay 1ST to terminal C. Relays 1ST and 1S pick up, and then a branch of the circuit just traced is completed from wire 57, back contact 5 of relay 1CS, front contact 4 of relay 1S, right-hand winding of relay AV to terminal C, so that relay AV is operated to the right to release relay 1ST. When relay AR picks up, relays 1ST and 1S are operated as above described and then relay AV is restored to the left, as shown in the drawing, by the closing of a similar circuit from terminal B, front contact 1 of relay AR, wire 58, back contact 3 of relay 1CS, front contact 5 of relay 1S, left-hand winding of relay AV to terminal C. The position of contact 1 of relay AV determines the character of the first element of a switch indication code, this element being short when contact 1 of relay AV is closed to the left and medium when it is closed to the right. Contacts 3 and 5 of relay 1CS are included in the circuits of relay AV to insure that this relay will not respond when relay AR changes its position during a code in order to delay the release of relay 1ST under these circumstances until the code then in progress is completed and the apparatus is in condition to transmit a new code.

Considering now the transmission of the switch indication code initiated by picking up relay 1S, if relay 1SC has released relay 1S is held energized over back contact 1 of relay 1CS and if the line is available, a pickup circuit for relay 1CS is closed from terminal B, front contact 1 of relay 1R, back contact 2 of relay 1T, back contact 1 of relay LB, back contacts 1 and 2 of relay LBP, contacts 4 of relays MC and MO, contact 3 of relay CT, wire 117, front contact 1 of relay 1S, back contact 1 of relay 1ST, relay 1CS to terminal C. Relay 1CS picks up, establishing a new holding circuit for relay 1S which may be traced from terminal B, back contact 3 of relay LBP (Fig. 3), back contact 2 of relay LB, wire 59, back contact 7 of relay 1F1, front contact 1 of relay 1CS, front contact 3 and winding of relay 1S to terminal C. Relay 1CS when energized closes a pickup circuit for relay 1MR, which is the same as the circuit just traced for relay 1CS from terminal B to wire 117, and then extends over front contact 1 of relay 1S, back contact 1 of relay 1ST front contact 2 of relay 1S, front contact 4 of relay 1CS, wire 118, relay 1MR to terminal C. Relay 1MR picks up, closing its stick contact 3 and establishing a holding circuit which is similar to that for the corresponding relay OMR of Fig. 1. Relay 1MR closes its front contact 1 to operate relay 1T to initiate the code as already described in connection with Fig. 1. When the station relay LB picks up, the holding circuit for relay 1S becomes energized by a connection from terminal B over front contact 2 of relay LB to wire 59 and thence as already described through relay 1S to terminal C. The pickup circuit for relay 1CS becomes opened as the various relays controlling this circuit are operated, but relay 1CS is held energized over a stick circuit which extends from terminal B over front contact 1 of relay 1R or front contact 2 of relay 1T, front contact 1 of relay LB, front contact 8 of relay 1MR, wire 118, front contact 4 of relay 1CS, contact 2 of relay 1S, relay 1CS to terminal C. The stepping apparatus of Fig. 3 functions to transmit an indication code in which the selecting elements are determined by adjustable connections to contacts 4, 5 and 6 of the stepping relays in the same manner as in the control code already described. Assuming the approach section to be unoccupied so that relay AR is energized, the first element will be short and will be determined by a circuit which may be traced from terminal B, front contact 2 of relay 1P, wire 60, front contact 6 of relay 1CS, left-hand contact 1 of relay AV, wire 120, front contacts 1 of relay MO and 1T, right-hand winding of relay PT to terminal C, so that relay PT will be operated to the right as soon as relay 1P picks up. If on the other hand the code being described is transmitted when AR is deenergized, contact 1 of relay AV will be closed to the right and the circuit in this case will be completed over wires 60 and 121 and relay PT will be operated to the right when relay MO releases to close its back contact 1, so that in this case the first element will be medium. After completing the first element, the coding apparatus of Fig. 3 continues to transmit the several selecting elements of the code in the manner already described in connection with Fig. 1. Certain of the circuits are arranged differently however in order to adapt the apparatus for use in installations having a plurality of stations, and these differences will now be pointed out. Some of the code elements will, in general, be identical in all codes transmitted from a station, and the transmitter control circuits for these elements may be energized by connecting terminal B directly to contact 4, 5 or 6 of the stepping relays, in place of a jumper connection to a contact 2 of a relay CS, as illustrated for example, by the connection to contacts 5 of relays 1A and 1B and to contact 6 of relay 1C. Furthermore, the pickup circuit of relay 1A is so arranged that the station receiver will not respond to the first element of an indication code transmitted by another station. This pickup circuit has two branches, one of which includes front contact 1 of relay 1P and a front contact 1 of register relay LOR and serves to cause relay 1A to become energized when receiving a control code, because the first element of each control code is long. The other branch includes front contacts 3 of relays 1MR and 1P, and serves to cause relay 1A to become energized when the station is sending an indication code, since in this case relay 1MR is energized. Both branches will be open and relay 1A will not become energized when another station is sending an indication code. When relay 1F1 picks up at the beginning of the seventh element it opens its back contact 7 to effect the release of relay 1S, and the latter relay then opens its front contacts to cause relay 1CS to release. The circuit for generating the seventh element, which in the case illustrated is medium and reflects the unlocked condition of the switch, becomes closed when relay MO releases and may be traced from terminal B, front contact 6 of relay 1F1, right-hand contact 1 of relay WV, wire 121, and thence over contacts 1 of relays L, MO and 1T and right-hand winding of relay PT to terminal C. When relay 1R picks up at the end of the code, the line remains steadily closed, relay MO picks up, and relays 1F1 and MOR, MC, L, LB, MR and LBP release in sequence in a manner similar to that already described.

When the switch completes its operation, indication relay KR becomes energized in the reverse direction, closing its right-hand polar contact 2 and completing a starting circuit so that relays 1ST, 1S and 1CS will again pick up, as already described, to initiate a second code. In this code, the seventh element will be long and will be determined by a circuit which may be traced from terminal B, front contact 6 of relay 1F1, left-hand contact 1 of relay 1WV, wire 61, right-hand contact 2 of relay KR, wire 122, and thence over contacts 1 of relays L, MO and 1T as already described, to operate relay PT to the right when relay L releases.

One novel feature of our apparatus resides in an arrangement whereby the starting circuits are restored automatically to normal in the event the station apparatus is out of order and unable to complete the transmission of a code. Thus, each starting relay ST must pick up to operate a relay V to a position in agreement with the new position of the device which initiated the code and then release to energize the corresponding code sending relay CS. The pick up and stick circuits for each relay CS of a series of storage units except that of the first unit of the series are arranged in a series hunting circuit including back contacts 1 and 4 of relay S and CS of each preceding storage unit and wires 117 and 118 respectively, so that relay CS of but one storage unit can be energized at a time. Furthermore, at the beginning of the code, the holding circuit of the energized storing relay S is transferred to wire 59, and in the event of a failure becomes opened due to the consecutive release of the station relays LB and LBP which control the connection of terminal B to wire 59. Since the device which initiated the code and its relay V now occupy corresponding positions, the starting relay ST remains deenergized until another change in the position of one of the devices controlling the storage unit takes place. Each storage unit is thus given but one opportunity to initiate a given code.

Considering now the operation of the office coding unit of Fig. 1, in receiving a switch indication code, although most of the operations are the same as when transmitting, since relay OMR is deenergized, certain operations will take place which do not occur when the coding unit operates as a transmitter and these will now be explained. Thus, when relay OR picks up at the end of an indication code, relay OMR is not energized and a connection is established from terminal B, front contact 2 of relay OR, contact 4 of relay LB, contact 3 of relay MC, back contact 3 of relay OMR and contact 2 of a register relay to wire 50, 51 or 52. If the first element of the indication code is short, relay OR will pick up while relay SOR is energized and complete a register circuit from wire 50, over front contact 3 of relay OP, relay TC to terminal C. If the first element is a medium element, it is terminated while relay MOR is picked up, and a similar circuit is completed over wire 51 and contact 4 of relay OP to pick up relay TO. It is evident, therefore, that either relay TC or relay TO is picked up depending upon whether the first element is short or medium. Relay TC or TO when picked up will complete its stick circuit which may be traced from terminal B, front contact 5 of relay LB, front contact 4 and winding of the relay to terminal C so that it will remain picked up until relay LB releases at the end of the code.

Assuming that the code is the first of the two switch indication codes described and reflects the unlocked condition of the switch, when relay OF1 picks up, its back contact 2 in the stick circuit of relay WK opens to release relay WK if energized. In case this code is initiated automatically, therefore, relay WK is released to light lamp WE to inform the operator that the switch has been unlocked or displaced, contact 1 of relay WK opening to prevent the energization of relay CS2 to send a code to clear a signal governing the movement of traffic over the switch. However, in the case described, relay WK was released when the control code was transmitted to operate the switch and therefore the first indication code effects no change in the office indication apparatus.

When the indication code is received having a long seventh element indicating that the switch is locked reverse, a register circuit is completed at the end of the code from terminal B to wire 52, thence over right-hand contact 3 of relay P1, front contact 2 of relay OF1, relay WK to terminal C, so that relay WK will pick up, extinguishing lamp WE and closing its contact 1 to prepare a circuit for relay CS2. When relay OF1 releases, the stick circuit of relay WK will again become closed so that relay WK will remain energized to cause lamp WE to remain dark. If the switch is operated to normal so that contact 3 of relay P1 is closed to the left as shown in the drawing, the seventh element of the indication code must be short in order to pick up relay WK, indicating that the switch is locked normal, the pickup circuit for relay WK being completed in this case from terminal B, over wire 50 and the left-hand contact of relay P1. It will be apparent that relay WK only becomes energized when relay P1 at the office and relay KR at the station occupy corresponding positions.

When relay OF1 picked up at the beginning of the seventh element of the switch indication code, the office indication relay AK was operated to a position corresponding to that of relay AV at the station. Thus assuming that relay TC has been energized by a code indicating that the approach section is clear, when relay OF1 picks up a circuit is closed from terminal B, front contact 1 of relay TC, wire 62, front contact 4 of relay OF1, left-hand winding of relay AK to terminal C. This will be without effect if the contacts of relay AK are already closed to the left, but if these contacts are closed to the right they will be returned to the left, contact 1 of relay AK opening to extinguish lamp AE. Contact 2 of relay AK is included in a circuit which may be traced from terminal B, contacts 2 of relays TK and AK, wire 63, contact 4 and winding of the bell relay XR to terminal C. This circuit opens momentarily when contact 2 moves from right to left, but this is without effect because relay XR is at that time energized by a pickup circuit from terminal B, back contact 1 of relay TO, relay XR to terminal C.

If now a code is received indicating that the approach section is occupied, relay TO becomes energized instead of relay TC, relay AK will be operated to the right by the closing of a circuit from terminal B, front contact 1 of relay TO, wire 64, contact 5 of relay OF1, right-hand winding of relay AK to terminal C. Lamp AE will become lighted, and the momentary opening of contact 2 of relay AK will cause relay XR to release and close its back contact 1, thereby causing a single stroke operation of bell XB. This occurs near the end of the code, and shortly afterward relay LB releases, restoring relays TO and XR and bell XB to their normal condition. Repetition of this code obviously is without effect, the contacts of relay AK remaining to the right, the bell sounding but once irrespective of the number of consecutive similar codes received.

We will now explain the operation of the storage units for governing the signals. We will assume that the operator has reversed lever W as described to send a code to reverse the switch and that he at once moves lever G to the right for the purpose of clearing arm b of signal R2. Relay N2 becomes released, deenergizing relay WL1 to lock relay P1 against operation. If lever W is moved again, before the switch control code is completed, relay N1 will release but relay CS1 will be held energized until relay S1 releases at the end of the code by a circuit from terminal B, back contact 4 of relay WL1, contact 4 of relay CS1, contact 5 of relay S1, relay CS1 to terminal C, so that the transmission of the switch code already initiated can not be interfered with. When relay N2 releases, if the left-hand contacts of relay MK are closed, a circuit is completed from terminal B, contact 1 of relay MK, right-hand winding of relay P2 and right-hand contact of lever G to terminal C to operate relay P2 to the right. As soon as the transmission of the switch control code above described is completed, relay OMR releases, and a circuit is closed from terminal B, back contact 2 of relay OMR, wire 13, back contacts 1 of relays H2 and N2, storing relay S2, key KD to terminal C, so that relay S2 picks up, completing a circuit from terminal B, back contact 4 of relay CS2, front contact 4 of relay S2, relay H2, right-hand contact 1 of relay P2, right-hand contact of lever G to terminal C. Relay H2 picks up and closes its stick circuit extending from terminal B, front contact 8 and winding of relay H2, the right-hand contacts of relay P2 and lever G to terminal C. Terminal B is now connected over back contact 2 of relay CS2, and front contact 6 of relay S2 to bus wire 15 to actuate the flasher relays FR1 and FR2 and lamp HE becomes energized intermittently over a circuit from terminal B, front contacts 1 of relays FL1 and FL2, bus wire 16, back contact 1 of relay CS2, front contact 2 of relay S2, lamp HE to terminal C. As soon as a code is received, indicating that the switch has completed its operation to a position corresponding to that of relay P1 so that relay WK picks up, a circuit is closed from terminal B, front contact 1 of relay WK, contact 5 of relay N1, contact 2 of relay H2, contact 5 of relay S2, relay CS2 to terminal C. Relay CS2, upon becoming energized, opens its back contact 1 in the circuit for lamp HE and its contact 2 in the circuit for actuating the flasher relays so that lamp HE remains dark and the operation of the flasher relays is discontinued. Relay CS2 also closes its front contacts 3 and 2 to initiate a control code which is transmitted in the manner hereinbefore described in connection with relay CS1, except that in this instance the character of the sixth element of the code is determined by a circuit completed over wire 46, leading to contact 5 of relay OE so that the sixth element of the code will be a medium element, and relay OF2 will become energized instead of relay OF1. The character of the seventh element of the code is determined in this case by a circuit which may be traced from terminal B, front contact 5 of relay OMR, wire 48, front contact 6 of relay OF2, front contact 1 of relay S2, back contact 3 of relay N2, right-hand polar contact 2 of relay P2, wire 22, back contacts 1 of relays L and MO, contact 1 of relay OT, right-hand winding of relay PT to terminal C, and will therefore be terminated when relay L releases and will be a long element. If lever G and relay P2 had been operated to the left, the seventh element of the code would have been determined by a similar circuit over the left-hand contact 2 of relay P2 and wire 20, and so would have been a short element.

When relay OF2 picks up, the connection from terminal B over its back contact 7 for energizing the stick circuit of relay S2 is opened, and this circuit becomes energized by a connection from terminal B, left-hand contact 1 of relay PT, wire 49, and front contact 7 of relay OF2, so that relay S2 releases when relay PT is operated to the right to terminate the seventh element of the code. When relay S2 releases a circuit is closed momentarily from terminal B, front contact 5 of relay OMR, wire 48, front contact 6 of relay OF2, back contact 1 of relay S2, front contact 3 of relay H2, right-hand winding of relay MK, key KD to terminal C so that relay MK is operated to the right to open the circuits for relays P2 and WL1. Relay MK is returned to its left-hand position only by the receipt of a code indicating that the signal are at stop and the approach locking is released, and until such code is received, relay P1 is locked to prevent the transmission of a switch control code, and relay P2 is locked to prevent the transmission of a code for clearing a signal for the direction of traffic opposite to that which has been established.

The control code for clearing signal R2 causes the station coding unit of Fig. 3 to operate to receive the code in a manner similar to that already described except that in this case relay IF2 will pick up instead of relay IF1, and the seventh element being long, at the end of the code a register circuit is completed from terminal B, over wire 152, contact 3 of relay IF2, right-hand winding of relay RHS to terminal C, causing relay RHS to close its right-hand contacts, completing a connection from terminal B over the right-hand contacts 2 of relays LHS and RHS to wire 65 to control signal R2. The local circuits for controlling the signals have been omitted to simplify our drawings, but these may be arranged in various ways well known in the art. Thus, for example, the circuits including wires 65 and 66 may be used to control the signal relays RH and LH of the Kemmerer patent, hereinbefore referred to. In any event, it is to be understood that arm b of signal R2, selected in accordance with the position of the track switch, will clear if traffic conditions are favorable, so that the corresponding indication relay RGP will become released and then the approach locking relay RMR will become released to lock the switch against operation. These relays govern the repeating relay MP over a circuit which may be traced from terminal B, contacts 3 of relays LHS and RHS, wire 67, contacts 3 of relays LMR and RMR, relay MP to terminal C. Relay MP releases when a signal clear code is received and then completes a circuit from terminal B, back contact 1 of relay MP, wire 68, resistor 69, right-hand winding of relay MV to terminal C, operating relay MV to the right to prepare a circuit for initiating a code when relay MP again picks up.

It is to be understood that no indication code will be initiated following the receipt of a signal clear control code in the event the signals remain at stop.

When signal R2 clears, relay RGP releases, and a circuit is closed from terminal B, back contact 1 of relay RGP, wire 70, left-hand contact 2 of relay GV, storing relay 2ST to terminal C. Relay 2ST upon picking up, completes a circuit for relay 2S in a manner similar to that already described in connection with relay 1S, relay 2S closing its contact 7 to operate relay GV to the right to open the starting circuit to release relay 2ST. Relay 2S remains energized to store the code until the line becomes available for transmission and then the code sending relay 2CS becomes energized, initiating the transmission of the code as already described, except that in this case the character of the first element is determined by a circuit which includes contact 6 of relay 2CS and contact 1 of relay TV and wire 120 or 121, for causing the first element to be short or medium to indicate the clear or occupied condition, respectively of the track section 1T. The character of the seventh element is determined by circuits which include front contact 6 of relay 1F2 and contacts 1 of relays GV and MV. In the case illustrated, relay GV has been operated to the right, completing a circuit from terminal B, contact 6 of relay 1F2, right-hand contact 1 of relay GV, to wire 122, so that the seventh element of the code will be long.

When the signal clear indication code is received at the office, relay OF2 will be operated, then wire 52 will be energized to complete a circuit including contact 3 of relay OF2 and the left-hand winding of relay HK to terminal C. Relay HK will be operated to the left, completing a circuit from terminal B, contact 1 of relay HK, back contact 2 of relay S2, lamp HE to terminal C so that HE becomes steadily lighted to indicate that the signal has been cleared. Relay WL1 is now deenergized and relays P1 and P2 are locked against operation.

A code may now be transmitted to put the signal to stop, by moving lever G to its mid-position, or the signal clear code may be repeated, by moving lever G away from and back to its right-hand position to effect the momentary release of relay H2, but no other codes can be transmitted as long as the contacts of relay MK are open. For example, if lever W is restored to normal, relay N1 will release to cause lamp WE to display a flashing indication, or if lever G is reversed, relay H2 will release and relay S2 will pick up to cause lamp HE to display a flashing indication.

Assuming that the signal is to be put to stop, lever G is restored to its mid-position, and then relay H2 releases, closing its back contact 1 to again energize relay S2. When relay S2 picks up, a circuit is closed from terminal B, back contact 5 of relay CS2, contact 3 of relay S2, relay N2 and the middle contact of lever G to terminal C so that relay N2 picks up to again establish its stick circuit, and to close a circuit from terminal B, contact 2 of relay N2, contact 5 of relay S2, relay CS2 to terminal C so that relay CS2 picks up to initiate the transmission of the signal stop code. In this code the circuit for determining the seventh element includes front contact 3 of relay N2 which connects terminal B over wire 48 to wire 21, so that the seventh element is medium. Lamp HE remains lighted, being energized over a branch circuit including front contact 1 of relay CS2 and front contact 2 of relay S2 while the code is being transmitted.

When the signal stop code is received at the station, the medium seventh element will be registered by the closing of a circuit over wire 151, front contact 2 of relay IF2, right-hand winding of relay LHS, left-hand winding of relay RHS to terminal C, so that these relays will be restored to the positions shown in the drawings. Arm b of signal R2 will therefore be restored to stop and relay RGP will again be energized, but if the signal is put to stop when the approach locking is effective, relays RMR and MP will remain deenergized. In this case an indication code will be initiated when relay RGP picks up completing a circuit for relay 2ST over wire 71 which is similar to that over wire 70 already described, and relay GV will be operated to the left by the closing of the circuit over contact 6 of relay 2S. When relay IF2 is energized, a circuit will be completed from terminal B, contact 6 of relay IF2, left-hand contact I of relay GV, right-hand contact I of relay MV to wire 121 to operate relay PT to the right when relay MO releases, so that the seventh element of the indication code will be medium.

When this code is received at the office, wire 51 will be energized when relay OF2 is picked up, completing a register circuit over its contact 2 and the right-hand winding of relay HK to terminal C, operating relay HK to the right to extinguish lamp HE.

When the approach locking at the station is released by the energization of relay RMR, relay MP will become energized, completing a circuit from terminal B, wire 72, right-hand contact 2 of relay MV, relay 2ST to terminal C to initiate an indication code and to restore relay MV to the left, as shown in the drawing by the closing of a circuit over contact 5 of relay 2S. When relay IF2 is energized, a circuit will be completed from terminal B, contact 6 of relay IF2, left-hand contacts I of relays GV and MV to wire 120, to that the seventh element of the code will be short.

When this code is received at the office, wire 59 will be energized when relay OF2 is picked up, completing a register circuit over its contact I, left-hand winding of relay MK, right-hand winding of relay HK to terminal C, operating relay MK to the left, so that relays P1 and P2 will again respond to the operation of their respective control levers. It is apparent, therefore, that the operator may send a code to put the signal to stop and immediately thereafter may operate the switch lever W, but the switch code will be stored and will be transmitted when an indication of the release of the approach locking is received.

The character of the first element of each signal indication code is determined by circuits including contact 5 of relay 2CS and contact I of relay TV, which function in the same manner as in the case of the corresponding circuits controlled by relays ICS and AV already described, and a code is initiated whenever track relay TR picks up or releases. If relay TR releases, its repeater relay TP will be released completing a circuit from terminal B, over its back contact 4, wire 73, contact 3 of relay TV, right-hand winding of relay TS to terminal C, operating relay TS to the right to close a circuit over contacts 2 of relays TV and TS to pick up relay 2ST. Relay 2S then picks up, closing a circuit from terminal B, back contact 2 of relay 2CS, front contact 4 of relay 2S, right-hand contact I of relay TS, right-hand winding of relay TV to terminal C, operating relay TV to the right to release relay 2ST to initiate the code. As in the case of relay AV, the circuit for relay TV includes a back contact of relay 2CS and therefore relay TV does not respond to a change in conditions while the code is being transmitted. When relays TR and TP again pick up, a circuit is closed from terminal B cover front contacts 4 of these relays, wire 74, contact 4 of relay TV, back contact 3 of relay 2S, left-hand winding of relay TS to terminal C, restoring relay TS to the left as shown in the drawing to again pick up relays 2ST and 2S to restore relay TV to the left, as shown in the drawing. Unless relay 2S becomes released due to a failure of the apparatus, it will remain energized until the track-occupied code is transmitted, and if relay TR picks up, the track-clear code will not be transmitted until after relay 2S releases to close its back contact 3.

The operation of the track indication relay TK is similar to that of relay AK already described, as will be apparent from the drawings.

We will now assume that a signal has been cleared and that a train accepts the signal and enters section IDT. Relay TR will release, deenergizing the slow-release relay TP. Before relay TP releases, a circuit is closed momentarily from terminal B, front contact 4 of relay TP, back contact 4 of relay TR, back contact 2 of relay CHS, wire 75, back contact 2 of relay IF2, right-hand winding of relay LHS, left-hand winding of relay RHS to terminal C, restoring these relays to the positions shown in the drawings, so that the signals will remain at stop until the signal control relays are gain operated by a signal clear code.

We will now assume that the operator, in order to facilitate the movement of a fleet of trains moving in the same direction, operates lever G to clear the signal and then operates key NSK. As indicated in the drawing, key NSK is provided with a spring actuated latch 76, which is held away from the key by a cam 77 on the shaft of lever G, when lever G is in its mid-position. When lever G is moved to the left or right to clear the signal and key NSK is operated, latch 76 becomes effective to hold the contact of key NSK closed against the action of its restoring spring. Although shown at one side for clearness, key NSK is preferably located behind lever G so that it can be operated only when lever G has been moved to the left or right, and it is evident that the contact of key NSK will open automatically when lever G is restored to its mid-position. Key NSK having been operated, when each train enters section IDT, relays LHS and RHS will be restored as described, and a code indicating the condition of the signals and of the track section will be transmitted, and a second code will follow as soon as the train leaves section IDT. At the end of this latter code, relay TC will be energized and relay TK will be operated to the left to extinguish lamp TE, and relay SOR or MOR will be energized so that a circuit will be closed from terminal B, front contact 2 of relay OR, contact 4 of relay LB, contact 3 of relay MC, back contact 3 of relay OMR, asymmetric unit 13r, contact 3 of relay SOR or MOR, contact 2 of relay TC, wire 78, contact 9 of relay OF2, key NSK, relay S2, key KD to terminal C. The unit 13r prevents improper operation of connected circuits such as might occur if current were permitted to flow in the reverse direction in this circuit. It follows, therefore, that when the train leaves section IDT, relay S2 will become energized and will therefore automatically initiate a signal clear code to again position relays RHS or LHS, so as to cause the signal to clear for a following train as soon as the first train has moved beyond the control limits of the signal.

We will now explain the operation of the apparatus employing the control code associated with relays OF3 and IF3. It will be assumed that the operator has sent a code to clear arm *a* or *b* of signal R2, but that the block is occupied so that the signal is prevented from clearing, and that he desires to then clear the low speed arm *c* to permit a following train to enter the occupied block. The operator then closes key CO, and if lever G is in its left-hand or right-hand position so that relay H2 is energized, a circuit is closed from terminal B, back contact 2 of relay LB, wire 79, contact 4 of relay H2, relay CS3, key CO to terminal C. Relay CS3 picks up, closing its contact 3 to initiate the code and its contact 2 to connect terminal B to wire 47 which leads to contact 6 of relay OE and completes circuits for determining the character of the code so that relays OF3 and IF3 will be picked up at the beginning of the seventh element, by the closing of circuits over wires 45 and 145, respectively. The character of the seventh element is determined by a connection from terminal B over wire 48, front contact 2 of relay OF3 to wire 22 and is therefore a long element. Key CO is a spring return key and is held closed by the operator until this element is transmitted, as indicated by the momentary lighting of lamp HE and then may be released. Relay CS3 is held energized during transmission by the closing of its stick circuit from terminal B, contact 8 of relay CS3, contact 4 of relay H2, relay CS3, key CO to terminal C. Lamp HE is momentarily lighted to indicate when key CO may be released by the closing of a circuit from terminal B, front contact 2 of relay OMR, wire 80, front contact 1 of relay OF3, lamp HE to terminal C.

At the station, when relay IF3 picks up, a circuit is closed from terminal B, back contact 2 of relay IMR, wire 113, contact 1 of relay IF3, wire 81, contact 1 of relay LHS or RHS, wire 82, relay CHS to terminal C. If relay LHS or RHS has been reversed to close its contact 1, relay CHS will pick up, completing a connection from terminal B, contact 4 of relay CHS to wire 81 so that relay CHS will remain energized until the signal is put to stop manually, the circuit over wire 75 for restoring the signal control relays when relay TR releases now being open at back contact 2 of relay CHS. Contact 1 of relay CHS may be included in a circuit for controlling the low-speed arm *c* of the signal, as in the Kemmerer patent hereinbefore referred to, so that this signal will clear when relay CHS is energized.

We will now explain how our apparatus is arranged when used to control a plurality of switches and signals. Since the stepping relays function in a like manner on each step of the code, circuits such as those illustrating the selection of the final stepping relay F may be employed to select one or more of the preceding stepping relays of the series. Thus, for example two more relays OE may be added to Fig. 1, with their jumper wires 41 and 27 connected to contacts 2 and 5 and to contacts 3 and 6, respectively, of relay OD, and then relay OD will control three relays OE just as relay OE now controls three relays OF. Fig. 1, together with three copies of Fig. 2, will then form a complete drawing of the office circuits for the control of nine station devices. It will be clear that in this arrangement the numbered bus wires of Fig. 1 are to be connected in multiple to the corresponding terminals of each Fig. 2, but that there will be three groups of wires 43, 44, 45, and also three groups of wires 26, 46, and 47, and for each Fig. 2, and the bell circuit including wire 63 will extend in series through the contacts 2 of all relays AK and TK. The nine station devices may be located at three or more stations such as stations 1 and 7 shown in Figs 8 and 10, each employing the apparatus of Figs. 3 or 4 in whole or in part, and arranged as hereinbefore described, or the nine devices may be located at the same station. In the latter case the station apparatus will be arranged to include two additional relays IE with jumper wires 141 and 127 connected to contacts 2 and 5, and to contacts 3 and 6, respectively, of relay ID, and then Fig. 3 together with three copies of Fig. 4 will form a complete drawing of the station circuits for the control of nine devices at a station. The numbered bus wires of Fig. 3 are to be connected in multiple to the corresponding terminals of each Fig. 4, but there will be three groups of wires 143, 144, 145, and also three groups of wires 126, 146 and 147, one for each Fig. 2, and the circuits including wires 117 and 118 will extend in series through the back contacts of all relays S and CS, respectively. Furthermore, the arrangement of storage units shown in Figs. 2 and 4 may be varied according to the requirements of the system and relays OE and IE may control three switches or three signals or govern the indication of six track sections. By a similar process the apparatus may be further extended so that ultimately all the different codes are employed, the circuits then being arranged so that each stepping relay controls three relays, thus relay OA will control three relays OB, and there will be nine relays OC, twenty-seven relays OD, eighty-one relays OE and two hundred forty-three relays OF.

Our apparatus is so arranged that the different codes may be transmitted over the same line circuit without interference. It has already been pointed out that no interference between control codes occurs if for example, relays CS1, CS2 and CS3 are energized at the same time, because if the circuit including contact 4 of relay OE is closed it terminates the element and the circuits including contacts 5 and 6 of relay OE are rendered ineffective, the codes corresponding to the other two relays CS being transmitted one at a time thereafter. The connections will be similarly arranged in the case of any code element when two or three of the possible characters are employed, and in each case, a short element takes precedence over a medium element and the latter takes precedence over a long element, so that no interference can occur between the different control codes transmitted from the office. No interference can occur between indication codes transmitted from the same station, because the circuits including wires 117 and 118 are so arranged that but one code sending relay at a station can be energized at a time.

No interference between codes initiated at different points can occur. If relay OT at the office and relays T at one or more stations pick up at the same time, relay OT will remain up to generate a long first element after relays T release, but the line relays R will fail to pick up because the line is held open by relay OT. The holding circuit for relay MR at each station including back contact 2 of relay T and front contact 1 of relay R will therefore be opened and relay MR at each station will release, thereby conditioning the station coding units to receive the control codes from the office. A somewhat different result will occur in the event two stations start the transmission of indication codes at the same time. If the code initiated by one station has a short first element and that initiated by the other has a medium first element, the latter code will take precedence, relay MR at the one station releasing as above described but in this case opening the pickup circuit for the stepping relay A which includes front contacts 3 of the station relays MR and P to interrupt the operation of the stepping relays at that station. In the event one or more successive elements of indication codes initiated simultaneously by different stations are identical, the relays T will operate in unison until a point is reached where an element of one code is of different length from the corresponding element of the others. If this is a line-open element, a medium element takes precedence over a short element and a long element takes precedence over either, as in the case of a first element. If it is a line-closed element, the reverse is true, a medium element taking precedence over a long element, and a short element taking precedence over a medium or a long element. Thus when a relay T picks up to terminate a line-closed element, the release of relay R at each station at which relay T has not picked up opens the holding circuit for relay MR at such station. It is clear, therefore, that in each case of simultaneous initiation of different codes but one relay MR will remain energized, and since the jumper connections to contacts 1, 2, 3 of the stepping relays are differently arranged at the different stations and no station can register an element which is not part of its code, but one pair of relays OF and F will be operated. It follows, therefore, that our apparatus possesses such flexibility that may be readily adapted to a wide variety of different conditions, and that each units may be arranged precisely in accordance with the needs of the system without including any idle apparatus, and that the apparatus will operate in an efficient and reliable manner because of the simplicity of the line circuit and of the various safeguards against improper operation hereinbefore described.

In the foregoing, our apparatus has been described with reference to an isolated switch and group of signals, but frequently a number of switches may be so located that one signal is interlocked with others and controls a plurality of routes, and each route may be determined by the positions of a number of different switches. Our apparatus is particularly adapted to control such interlocked switches and signals, and when so employed the circuits for relays WL1 and CS2 by means of which the control levers are electrically interlocked may be modified or extended to include contacts governed by other related levers or devices. In explaining this feature of our invention reference will be made to Figs. 5 to 9, inclusive. Fig. 5 is a track plan typical of interlockings in general, comprising two switch sections 3DT and 5DT connected by a crossover, the two sections being independent so that parallel train movements may be made when the crossover switches 3SW and 3A—SW are normal, but forming part of the same routes when the crossover switches are reversed. It is to be understood that the apparatus of Fig. 5 is arranged in two groups, each similar to that hereinbefore described, one including sections 5DT and 5AT, switch 5SW and signals 6L and 6R, the other including sections 3DT and 3AT, switch 3SW and signals 4L and 4R, while switch 3A—SW is operated in unison with switch 3SW and is controlled by the same relay WS. It is further to be understood that the coding unit for controlling these groups is governed by the line relay bearing the reference 2R in Fig. 10, that this unit is arranged with two relays E in the manner hereinbefore described, including one for each group, and that the circuits for each group are similar to those of Figs. 2 and 4 except that the circuits corresponding to those of relays WL1 and CS2 in Fig. 2 are arranged as illustrated in Figs. 6 and 7, each of the relays WL and CS for ready identification, being designated by the number of the signal or switch with which it is associated.

The various contacts in Figs. 6 and 7 are for simplicity shown apart from the relays which operate them, but each contact bears a number identifying the contact as in Fig. 2, and above this number is a reference identifying the relay which operates it, comprising a letter or letter combination identical with that of the corresponding relay of Fig. 2 followed by a number identifying the switch or signal with which the relay is associated. Thus, in Fig. 6, code sending relay CS6 for governing signals R6 and L6 has a circuit which may be traced from terminal B, contact 2 of relay N6, contact 5 of relay S6, relay CS6 to terminal C which may be closed to initiate a code to put signals L6 and R6 to stop, and relay CS4 has a similar circuit which may be closed to initiate another code to put signals L4 and R4 to stop, these circuits being similar to the corresponding circuit for relay CS2 hereinbefore described. When the crossover switches 3SW and 3A—SW have been operated to normal, the polar relay P3 associated with the control lever W for these switches will have its contacts closed to the left, and the polar relay P4 associated with the control lever G for signals L4 and R4 will have its contacts closed to the left or right, depending upon whether the direction of traffic last established is for a train movement toward the left or toward the right. When the crossover is normal, relay CS4 may be energized over a circuit which may be traced either from terminal B, left-hand contact 3 of relay P4, contact 1 of the indication relay WK3 for the crossover switches, relay N3 associated with the crossover lever W, normal contact 5 of relay P3, left-hand contact 4 of relay P4, to wire 83 or from terminal B, right-hand contact 4 of relay P4, normal contact 5 of relay P3, contact 5 of relay N3, contact 1 of relay WK3, right-hand contact 3 of relay P4 to wire 83, and thence over back contact 4 of relay N4, front contact 2 of relay H4, front contact 5 of relay S4, relay CS4 to terminal C. These circuits may be closed to initiate a code to clear signal L4 or to clear arm a of signal R4, according to the position of relay P4, and thus function in the same manner as the circuits for initiating a code to clear a signal L2 or R2, but only when the crossover switches and their control lever are normal.

Relay CS6 may be energized by similar circuits to initiate a code to clear arm a or arm d of signal L6 or to clear signal R6, the circuits for relay CS6 including contacts 1 and 5 of the indication relay WK5 and the lever relay N5 associated with switch 5SW, and in addition, including contacts 2 and 6 of relays WK3 and N3 and the normal contact 4 of relay P3. It will be clear that these circuits for relay CS6 are available only when the position of switch 5SW corresponds to that of its control lever and the crossover switches and their control lever are normal.

Arm b of signal R4 governs the movement of traffic over the crossover reversed, and relay CS4 may be energized to initiate a code to clear this signal by the closing of a circuit from treminal B, left-hand contact 4 of relay MK6, front contact 4 of relay N6, left-hand contact 4 of relay P6, wire 84, contact 5 of relay N5, contact 1 of relay WK5, reverse contacts 4 and 5 of relay P3, contact 5 of relay N3, contact 1 of relay WK3, right-hand contact 3 of relay P4, wire 83 and thence as already described through relay CS4 to terminal C. Front contact 4 of the lever relay N6 in this circuit closes when lever G for signals L6 and R6 is put to its stop position, but if the contacts of relay P6 are closed to the left, the established direction of traffic is toward the left and the signal put to stop is signal L6, this being the signal opposing signal R4 when the crossover is reversed, and the circuit will be held open until the approach locking associated with signal L6 is released to cause contact 4 of the corresponding indication relay MK6 to close to the left. Relay P6 can be operated to the right only when signal L6 is at stop and the approach locking associated with that signal is released, as will be clear from a consideration of the circuits for the similar relay P2 hereinbefore described in connection with Fig. 2, and if relay P6 has been operated to the right, the connection from terminal B over contacts 4 of relays MK6, N6 and P6 to wire 84 in the circuit just described are replaced by a connection from terminal B, right-hand contact 4 of relay P6 to wire 84. It follows, therefore, that relay CS4 can be energized to initiate a code to clear arm b of signal R4 provided the lever controlling the crossover switches has been reversed and these switches have assumed the reverse position provided switch 5SW agrees in position with its lever, and also provided the signal lever for controlling the opposing signal L6 is in its stop position and this signal indicates stop and the associated approach locking is released.

It is to be understood in this connection that the control circuits are arranged as illustrated in the hereinbefore mentioned Kemmerer patent, in that the control circuit for each signal includes a front contact of the approach locking relay for the opposing signal and other contacts close when the switch or switches correspond in position with their control relays, so that the conditions governing the transmission of codes to control the signals correspond to the conditions governing their operation.

When relay P4 has been operated to the left, as shown, no circuit for relay CS4 including the reverse contact of relay P3 is available. It follows that when the crossover is reversed, the code for clearing signal L4 can not be initiated.

Arm b or arm d of signal L6, depending upon the position of switch 5SW governs the movement of traffic toward the left over the crossover reversed. Relay CS6 may be energized to clear one or the other of these signals by the closing of a circuit from terminal B, contact 4 of relay MK4, front contact 4 of relay N4, wire 83, over the right-hand contact 3 of relay P4, or from terminal B over the left-hand contact 3 of relay P4 thence over contact 1 of relay WK3, contact 5 of relay N3, reverse contacts 5 and 4 of relay P3, contact 1 of relay WK5, contact 5 of relay N5, wire 84, left-hand contact 4 of relay P6, back contact 4 of relay N6, front contact 2 of relay H6, front contact 5 of relay S6, relay CS6 to terminal C. A code for clearing arm b or arm d of signal L6 may thus be initiated provided the crossover switches and their lever are reversed, switch 5SW agrees in position with its lever, the opposing signal R4 and its lever are at stop and the approach locking associated with these signals is released. Furthermore, when relay P3 is reversed, there is no circuit for relay CS6 available if relay P6 has been operated to the right, therefore when the crossover is reversed the code for clearing signal R6 can not be initiated.

It will be clear from the foregoing that the circuits of Fig. 6 form a route network which is a counterpart of the track layout of Fig. 5, comprising circuits for each route completed by contacts of polar stick relays associated with the switch levers and indicating the positions to which the switches have been operated, the integrity of these circuits being checked by contacts of switch lever relays N which when closed indicate that the polar contacts correspond in position to the switch lever and by contacts of switch indication relays WK which when closed indicate that the switches have been operated to a corresponding position, and furthermore that the direction of the flow of current in these circuits is governed by contacts of polar stick relays associated with the signal levers which indicate the established direction of traffic, and that the route circuits are controlled by contacts of signal relays N and H so that a code for initiating a code to put a signal to stop can be transmitted at any time, but a code for clearing a signal can be transmitted only when the desired route as indicated by the positions of the switch and signal levers has been rendered available.

Considering now Fig. 7, relay WL5 is the lock relay governing relay P5 associated with lever W for operating switch 5SW and has a circuit which may be traced from terminal B, contact 3 of relays TK5 and MK6, contact 5 of relay N6, normal contact 6 of relay P3, relay WL5 to terminal C. Relay TK5 is the indication relay for section 5DT and relays MK6 and N6, as already described, are associated with the signals governing the movement of traffic over section 5DT. Contact 6 of relay P3 becomes closed to the left when the crossover lever W is operated to normal, and then the circuit for relay WL5 functions in the same way as that of the corresponding relay WL1 of Fig. 2. Relay WL3 is the lock relay governing relay P3 associated with lever W for operating switches 3SM and 3A—SM and has a circuit which may be traced from terminal B, contacts 3 of relays TK5 and MK6, contact 5 of relay N6, contacts 3 of relays TK3 and MK4, contact 5 of relay N4, relay WL3 to terminal C. Relay TK3 is the indication relay for section 3DT and relays MK4 and N4 are associated with the signals for that section, as already described. It follows that relay P3 controlled by relay WL3 will be locked when section 3DT or 5DT is occupied, or when any one of the signals of Fig. 5 has been cleared, or if either signal lever G is moved from its stop position. When relay P3 is reversed to close its right-hand contact 6, relay WL5 has a circuit which, as is apparent from the drawings, is similar to that of WL3. It follows that when the crossover is reversed the lever locking conditions for switch 5SW are the same as those for the crossover, but that when the crossover is normal, the locking of switch 5SW is independent of conditions in section 3DT. It will be apparent that these principles may be readily applied to more complicated layouts and that whatever the arrangement of track and signals may be, the circuits may be arranged so that codes for controlling the switches and signals can be initiated only in the proper sequence and under conditions favorable for their operation, and in such a manner that the proper manipulation of the control levers by the operator is enforced.

The interlocked control of the code sending relays may be further extended to include relays governing switches and signals at different points, since the interlocking circuits are located at the office and are thus independent of the location of the controlled devices, and a large interlocking may be sub-divided and controlled by station units at different locations. This feature of our invention is illustrated more particularly by Figs. 8 and 9. Fig. 8 illustrates a portion of a signaling system for a single track railroad which it is to be understood in its complete form comprises a plurality of portions such as that shown in Fig. 8 laid end to end. The switches and signals at the various stations may, for example, be controlled by circuits such as those disclosed in the Wallace Patent No. 1,959,072, issued May 15, 1934, for Railway traffic controlling apparatus. It will be clear from a comparison of the drawings of this patent with our Fig. 4 that our switch and signal relays are adapted to control or replace the code-controlled relays C of the patent and that our indication relays are adapted to be controlled by the various relays T, K, L and M of the patent.

Fig. 9 shows locking circuits corresponding to those of Fig. 6 but arranged to control code sending relays CS2 and CS8 which serve to initiate control codes for controlling the signals of Fig. 8, these circuits being arranged to provide interlocked control of the signals at adjacent locations. Relay CS2 has a circuit including front contact 2 of relay N2 closed to initiate a code to put signals L2 and R2 to stop which is identical with that shown in Fig. 2, as hereinbefore described, and relay CS8 has a similar circuit. Relay CS2 has a second circuit including front contact 2 of relay H2 closed to initiate a code to clear arm a or arm b of signal L2 which may be closed when the same traffic direction is established at the next station at the left so that the contacts of relay P8 are closed to the left or if the opposing direction is established and the signals at that station have been put to stop and the approach locking released. This circuit for relay CS2 may be traced from terminal B, left-hand contact 5 of relay P8 to wire 85, or from terminal B, contacts 4 of relays MK8 and N8, right-hand contact 3 of relay P8 to wire 85, thence over left-hand contact 5 of relay P2, contact 1 of relay WK1, contact 5 of relay N1, back contact 6 of relay N2, front contact 2 of relay H2, contact 5 of relay S2, relay CS2 to terminal C. This circuit is governed by conditions affecting switch 1SW in the same manner as the corresponding circuit of Fig. 2, and in addition by conditions affecting the next signal L8 in advance but is independent of conditions affecting switch 7SW. Relay CS8 has a similar circuit, oppositely arranged for governing the initiation of codes for clearing arm a or arm b of signal R8. It follows that codes for establishing a route leading into the single track stretch can be transmitted only when conditions are proper and that when a route is established it is impossible for the operator to interfere with the movement of traffic by an attempt to transmit a code for operating a switch at the same station or for clearing a conflicting or opposing signal at the next station in advance. Relay CS2 also has a circuit closed over wire 86 to initiate a code for clearing arm a of signal R2 when switch 1SW is normal, and considering the right-hand and left-hand portions of Figs. 8 and 9 to be interchanged, one branch of this circuit may be traced from terminal B, reverse contact 4 of relay P7, to wire 86. A second branch extends from terminal B, right-hand contact 4 of relay P8, normal contact 4 of relay P7 to wire 86, and a third branch extends from terminal B, contacts 4 of relays MK8 and N8, left-hand contact 3 of relay P8, contact 5 of relay N7, contact 1 of relay WK7, left-hand contact 4 of relay P8 and normal contact 4 of relay P7 to wire 86. From this point the circuit may be traced over normal contact 4 of relay P1, right-hand contact 4 of relay P2, contact 1 of relay WK1, contact 5 of relay N1, back contact 6 of relay N2, contact 2 of relay H2, contact 5 of relay S2, relay CS2 to terminal C. The initiation of the code for clearing arm a of signal R2 is governed by conditions affecting switch 1SW in the same way as in Fig. 2, and in addition is governed over wire 86 by conditions at the next station in advance. Thus arm a of signal R2 can be cleared when relay P7 for controlling switch 7-SW is reversed, because the next signal in advance of signal R2, namely, arm a of signal R8, will then be at stop, and the opposing arm a of signal L8 can not be cleared. Arm a of signal R2 can be cleared if relay P7 is normal, provided relay P8 has been operated to the right to establish the same traffic direction or if the opposing signal L8 has been put to stop and its approach locking released. Relay CS2 has a similar circuit closed over wire 87 to initiate a code for clearing arm b of signal R2 when switch 1SW is reversed, which is the same as that for arm a except that it includes reverse contact 5 of relay P1, wire 87 and contact 5 of relay P7 in place of normal contact 4 of relay P1, wire 86 and contact 4 of relay P7. The initiation of the code for clearing arm b of signal R2 is thus governed by conditions affecting switch 1SW in the same way as in Fig. 2, and in addition is governed over wire 87 by conditions at the next station in advance. Thus, arm b of signal R2 can be cleared when relay P7 for controlling switch 7SW is normal, because arm b of signal R8 in advance will then be at stop, and the opposing arm b of signal L8 can not be cleared. Arm b of signal R2 can also be cleared if relay P7 is reversed, provided relay P8 has been operated to the right to establish the same traffic direction or the opposing signal L8 has been put to stop and its approach locking released. Relay CS8 has similar circuits, oppositely arranged, for governing the initiation of codes for clearing arm a or arm b of signal L8 for governing traffic movements in the opposite direction.

It will be apparent to one skilled in this art that the principles of lever locking illustrated in Figs. 6 and 9 may be combined to interlock the signal levers of adjacent interlockings each having a plurality of signal levers, and that whatever the arrangement of signals may be, it is manifest that our apparatus is adapted to provide interlocked control of the circuits for initiating the transmission of control codes in accordance with the indicated traffic conditions and the positions of the control levers, in such a manner that a series of control codes will be transmitted in the proper order and under such conditions as will facilitate and safeguard the movement of traffic.

Although we have herein shown and described but a few forms of remote control apparatus embodying our invention, it is understood that various changes and modifications may be made therein within the scope of the appended claims without departing from the spirit and scope of our invention.

Having thus described our invention, what we claim is:

1. In a centralized traffic control system for railroads, two spaced stations connected by a normally closed line circuit, a series of contacts at each station arranged to close one at a time at spaced time intervals when the line circuit opens, control means at one station for opening the line circuit to initiate the operation of said contacts, means governed by the series of contacts at said one station for closing the line circuit at the end of a selected time interval, a second series of contacts at each station arranged to close one at a time at spaced time intervals when the line circuit closes, means governed by the second series of contacts at said one station for opening the line circuit at the end of a selected time interval, a series of stepping relays at the other station arranged to be operated one at a time in sequence as said line circuit is opened and closed repeatedly, means controlled by the contacts at said other station for selecting certain of said relays for operation in accordance with the relative length of time the line circuit is opened or closed, a traffic governing device, means controlled by the last relay of the series for operating said device, and means effective when said last relay is operated to restore said control means to its initial condition.

2. Means for selectively controlling a movable device comprising a two-position line relay, means operating said relay alternately to its two positions for selected time intervals arranged to form a code signal, a series of stepping relays arranged to be operated one at a time in sequence, time controlled means controlled by said line relay and selectively operable in accordance with the relative lengths of each of said time intervals, means operating the first stepping relay of the series in response to a first operation of said line relay, means governed in accordance with the condition of said time controlled means for selectively operating a different stepping relay in response to each succeeding operation of said line relay, each stepping relay being operated only if the corresponding time interval is in accordance with said code signal, and means governed by the last stepping relay of the series for controlling said device.

3. Means for selectively controlling a movable device comprising a two-position line relay, means operating said relay alternately to its two positions for selected time intervals arranged to form a code signal, a series of stepping relays arranged to be operated one at a time in sequence, time controlled means controlled by said line relay and selectively operable in accordance with the relative lengths of each of said time intervals, means operating the first stepping relay of the series in response to a first operation of said line relay, means governed in accordance with the condition of said time controlled means for selectively operating a different stepping relay in response to each succeeding operation of said line relay, each stepping relay being operated only if the corresponding time interval is in accordance with said code signal, and means governed by the last stepping relay of the series for selectively controlling said device in accordance with the condition of said time controlled means.

4. Means for selectively controlling a movable device comprising a two-position line relay, means operating said relay alternately to its two positions for selected time intervals, a series of stepping relays arranged to be operated one at a time in sequence, means operating the first stepping relay of the series in response to a first operation of said line relay, means selectively operating a different stepping relay in response to each succeeding operation of said line relay in accordance with the time interval between such operation and the next preceding operation of the line relay, and means governed by the last stepping relay of the series for controlling said device.

5. In combination with a line relay capable of assuming two positions, means for operating said relay alternately to said two positions for selected time intervals, two timing devices, means for selectively operating one timing device in accordance with the length of time the line relay remains in one position, means for selectively operating the other timing device in accordance with the length of time the line relay remains in the other position, a series of stepping relays, and means controlled by said timing devices for selectively operating said relays one at a time to register the relative lengths of a series of such time intervals.

6. In combination with a line relay capable of assuming two positions, means for operating said relay alternately to said two positions for selected time intervals, two timing devices, means for selectively operating one timing device in accordance with the length of time the line relay remains in one position, means for selectively operating the other timing device in accordance with the length of time the line relay remains in the other position, and means controlled alternately by said timing devices for operating a different relay of the series for each successive operation of the line relay but only if such operations are timed in accordance with a particular code pattern.

7. In combination with a line relay capable of assuming two positions, means for operating said relay alternately to said two positions for selected time intervals, two timing devices, means for selectively operating one timing device in accordance with the length of time the line relay remains in one position, means for selectively operating the other timing device in accordance with the length of time the line relay remains in the other position, means controlled by each timing device when operated for closing a series of contacts one at a time in sequence at spaced time intervals, a series of stepping relays, and means controlled alternately by one said series of contacts or the other and by said line relay for operating said stepping relays one at a time in sequence.

8. In combination with a line relay capable of assuming two positions, means for operating said relay alternately to said two positions for selected time intervals, two timing devices, means for selectively operating one timing device in accordance with the length of time the line relay remains in one position, means for selectively operating the other timing device in accordance with the length of time the line relay remains in the other position, means controlled by each timing device when operated for closing a series of contacts one at a time in sequence at spaced time intervals, a series of stepping relays, means controlled by said series of contacts for selecting a particular stepping relay for operation in response to each operation of said line relay, and means responsive to each operation of the line relay for operating the selected stepping relay only if each preceding stepping relay of the series has been operated.

9. In combination with a line relay capable of assuming two positions, means for operating said relay alternately to said two positions for selected time intervals, two timing devices, means for selectively operating one timing device in accordance with the length of time the line relay remains in one position, means for selectively operating the other timing device in accordance with the length of time the line relay remains in the other position, a series of register relays for each timing device, means controlled by each timing device when operated for energizing the associated register relays one at a time in sequence at spaced time intervals, a series of stepping relays, and means controlled by said register relays and by said line relay for operating said stepping relays one at a time in sequence.

10. In combination with a line relay capable of assuming two positions, means for operating said relay alternately to said two positions for selected time intervals, two timing devices, means for selectively operating one timing device in accordance with the length of time the line relay remains in one position, means for selectively operating the other timing device in accordance with the length of time the line relay remains in the other position, a series of register relays for each timing device, means controlled by each timing device when operated for energizing the associated register relays one at a time in sequence at spaced time intervals, a series of stepping relays, and means including the line relay and that register relay which is energized when the line relay is operated for operating each of said stepping relays.

11. In combination with a line relay capable of assuming two positions, means for operating said relay alternately to said two positions for selected time intervals, two timing devices, means for selectively operating one timing device in accordance with the length of time the line relay remains in one position, means for selectively operating the other timing device in accordance with the length of time the line relay remains in the other position, a series of register relays for each timing device, means controlled by each timing device when operated for energizing the associated register relays one at a time in sequence at spaced time intervals, a series of stepping relays, means controlled by said register relays for selecting a particular stepping relay for operation in response to each operation of said line relay, and means responsive to each operation of the line relay for operating the selected stepping relay only if each preceding stepping relay of the series has been operated.

12. Apparatus for the selective control of movable devices comprising a two-position relay, means for operating said relay repeatedly to one position and for retaining the relay in said position for different time intervals, a slow-release relay, means deenergizing said slow release relay when the two-position relay is operated to said one position, two register relays, circuits for consecutively energizing said register relays including a contact closed when the two-position relay is operated to said one position and also including front and back contacts respectively of said slow-release relay, and means depending upon which register relay is picked up when the two-position relay is operated to its other position for controlling a particular one of said devices.

13. Apparatus for the selective control of movable devices comprising a two-position relay, means for operating said relay repeatedly to one position and for retaining the relay in said position for different time intervals, a slow-release relay, means deenergizing said slow release relay when the two-position relay is operated to said one position, two register relays, circuits for consecutively energizing said register relays including a contact closed when the two-position relay is operated to said one position and also including front and back contacts respectively of said slow-release relay, two selector relays, means for selectively operating one selector relay or the other depending upon which register relay is energized when the two-position relay is operated to its other position, and means controlled by each selector relay for controlling a different one of said devices.

14. Apparatus for the selective control of movable devices comprising a two-position relay arranged to be operated alternately to said two positions for selected time intervals, a slow-release relay for each of said two positions, means deenergizing each slow-release relay when the two-position relay is operated to a corresponding position, a pair of register relays for each slow-release relay, circuits for consecutively energizing the register relays of each pair including front and back contacts respectively of the associated slow-release relay and a contact closed when such slow-release relay is deenergized by an operation of said two-position relay, and means dependent upon which register relay of a pair is energized when the two-position relay is next operated for selectively controlling a particular one of said devices.

15. Apparatus for the selective control of movable devices comprising a two-position relay arranged to be operated alternately to said two positions for selected time intervals, a slow-release relay for each of said two positions, means deenergizing each slow-release relay when the two-position relay is operated to a corresponding position, a pair of register relays for each slow-release relay, circuits for consecutively energizing the register relays of each pair including front and back contacts respectively of the associated slow-release relay and a contact closed when such slow-release relay is deenergized by the operation of said two-position relay, a plurality of selector relays including one for each register relay, and means dependent upon which register relay is energized when the two-position relay is next operated for operating a particular one of said selector relays, and means controlled by the operated selector relay for controlling a particular one of said devices.

16. Apparatus for the selective control of movable devices comprising a two-position relay arranged to be operated repeatedly to one position and to remain in such position for selected time intervals, a first and a second slow-release relay, an energizing circuit for the first slow-release relay which opens when the two-position relay is operated to said one position, an energizing circuit for the second slow-release relay which opens when the first slow-release relay releases, three register relays, energizing circuits for said register relays controlled by the slow-release relays and arranged to close consecutively at spaced time intervals when the two-position relay is operated to said one position, and means depending upon which register relay is picked up when the two-position relay is operated to its other position for controlling a particular one of said devices.

17. Apparatus for the selective control of movable devices comprising a two-position relay arranged to be operated repeatedly to one position and to remain in such position for selected time intervals, a first and a second slow-release relay, an energizing circuit for the first slow-release relay which opens when the two-position relay is operated to said one position, an energizing circuit for the second slow-release relay which opens when the first slow-release relay releases, three register relays, energizing circuits for said register relays controlled by the slow-release relays and arranged to close consecutively at spaced time intervals when the two-position relay is operated to said one position, three selector relays, means for selectively operating one selector relay or another depending upon which register relay is energized when the two-position relay is operated to its other position, and means controlled by each selector relay for controlling a different one of said devices.

18. Apparatus for the selective control of movable devices comprising a two-position line relay arranged to be operated alternately to said two positions at selectively spaced time intervals, two slow-release relays including one for each of said two positions, an energizing circuit for each slow-release relay which opens when the line relay is operated to a corresponding position, a slow-release repeater relay, an energizing circuit for said repeater relay which opens when either of said two slow-release relays is released, a group of three register relays for each position of said line relay, circuits for the register relays of each group controlled by the corresponding slow-release relay and by said repeater relay, said circuits being arranged to close consecutively at spaced time intervals when the line relay remains in a corresponding position, and means dependent upon which register relay is picked up when the line relay is operated to its other position for controlling a particular one of said devices.

19. In combination with a line relay capable of assuming two positions, means for operating said relay alternately to said two positions for selected time intervals, two timing devices, means for operating one said timing device when said relay is in one position, means for operating the other timing device when said relay is in its other position, a series of stepping relays, means for energizing the first relay of said series in response to the first operation of said line relay, means for energizing selected ones of the remaining relays of said series one at a time in sequence in response to the alternate operation of said line relay, means controlled by said timing devices for selecting each of such remaining relays one at a time for operation, and means releasing each relay in turn while the next succeeding relay of the series is energized.

20. In combination with a two-position relay, means operating said relay alternately to said two positions at variably spaced time intervals, a first series of contacts arranged to close one at a time at spaced intervals when the relay remains in one of said two positions, a second series of contacts arranged to close one at a time at spaced intervals when the relay remains in its other position, a movable device, and means controlled by said contacts for selectively controlling said device in accordance with the relative length of time between the consecutive operations of said relay.

21. In combination with a two-position relay, means operating said relay alternately to said two positions at variably spaced time intervals, a first series of contacts arranged to close one at a time at spaced intervals when the relay remains in one of said two positions, a second series of contacts arranged to close one at a time at spaced intervals when the relay remains in its other position, a series of stepping relays, means operating the first relay of said series when the two-position relay first moves to its one position, and means controlled alternately by said two series of contacts for operating each of the remaining stepping relays one at a time in sequence, each of said relays being selected for operation in accordance with the relative length of time between the consecutive operations of said two-position relay.

22. In combination, a control relay, a selector of the relay type adapted to be operated by said control relay comprising a series of stepping relays interconnected to permit successive energization of the relays, a pickup circuit for each stepping relay including a contact of said control relay, a time-controlled contact, and a front contact of the next preceding stepping relay of the series, a stick circuit for each stepping relay including its own front contact and said control relay contact, and time-measuring means set into operation when said control relay contact opens for closing said time-controlled contact.

23. In combination, a control relay, a selector of the relay type adapted to be operated by said control relay comprising a series of stepping relays interconnected to permit successive energization of the relays, a pickup circuit for each stepping relay including a contact of said control relay, a selected one of a plurality of time-controlled contacts, and a front contact of the next preceding stepping relay of the series, a stick circuit for each stepping relay including its own front contact and said control relay contact, and means set into operation when said control relay contact opens for closing said time-controlled contacts one at a time in sequence at measured time intervals.

24. Code-transmitting apparatus comprising a transmitter relay capable of assuming two positions, means for transmitting a code element in response to operation of said relay to either said position comprising one series of contacts arranged to close one at a time in sequence at spaced time intervals if said relay remains in one position, another series of contacts arranged to close one at a time in sequence at spaced time intervals if said relay remains in its other position, and means controlled by said contacts for selectively timing the successive operations of said relay to produce a code.

25. Code transmitting apparatus comprising a transmitter relay capable of assuming two positions, means for transmitting a code element in response to operation of said relay to either said position comprising one series of contacts arranged to close one at a time in sequence at spaced time intervals if said relay remains in one position, another series of contacts arranged to close one at a time in sequence at spaced time intervals if said relay remains in its other position, and means controlled by each series of contacts for controlling the length of time said relay remains in the corresponding position.

26. Code transmitting apparatus comprising a transmitter relay capable of assuming two positions, means for transmitting a code element in response to operation of said relay to either said position comprising one series of contacts arranged to close one at a time in sequence at spaced time intervals if said relay remains in one position, another series of contacts arranged to close one at a time in sequence at spaced time intervals if said relay remains in its other position, and means controlled by said contacts for varying the time between successive operations of said relay.

27. Code transmitting apparatus comprising a transmitter relay capable of assuming two positions, means for transmitting a code element in response to operation of said relay to either said position comprising one series of contacts arranged to close one at a time in sequence at spaced time intervals if said relay remains in one position, another series of contacts arranged to close one at a time in sequence at spaced time intervals if said relay remains in its other position, a series of stepping relays, means controlled by said transmitter relay for energizing said stepping relays one at a time in sequence, one stepping relay being operated in response to each operation of said transmitter relay, and means controlled by said stepping relays and by said contacts for governing the successive operations of said transmitter relay to produce a series of time-spaced code elements.

28. Code transmitting apparatus comprising a transmitter relay capable of assuming two positions, means for transmitting a code element in response to operation of said relay to either said position comprising one series of contacts arranged to close one at a time in sequence at spaced time intervals if said relay remains in one position, another series of contacts arranged to close one at a time in sequence at spaced time intervals if said relay remains in its other position, a series of stepping relays, means controlled by said transmitter relay for energizing said stepping relays one at a time in sequence, one stepping relay being operated in response to each operation of said transmitter relay, means controlled by said stepping relays for controlling the successive operations of said transmitter relay to produce a series of impulses, and manually adjustable means including selected ones of said contacts for governing said operations to produce a code of impulses of selected lengths spaced by intervals of selected lengths.

29. Apparatus for repeatedly interrupting a line circuit comprising a two-position relay adapted to remain in its last-operated position when deenergized, a line relay included in said line circuit, means for closing said line circuit at the end of a measured time interval after the two-position relay is operated to one position, means for opening said line circuit at the end of a measured time interval after the two-position relay is operated to its other position, means effective when the line relay is deenergized to operate the two-position relay to said one position, and means effective when the line relay is energized to operate the two-position relay to its other position.

30. In combination with a transmitting relay and a line circuit controlled by said relay, a line relay included in said line circuit, a series of contacts arranged to close one at a time in sequence when said line relay is energized, means selectively controlled over one or another of said contacts to operate said transmitting relay to open the line circuit, a second series of contacts arranged to close one at a time in sequence when said line relay is deenergized, and means selectively controlled over one or another of the contacts of said second series to operate said transmitting relay to close said line circuit.

31. Code transmitting apparatus for delivering to a line circuit a multiple element code characterized by the time spacing of the successive code elements, a transmitting contact included in said line circuit, a code-sending relay, means effective when said relay is operated to cause an initial operation of said contact, two series of timing contacts, the contacts of one series or the other being arranged to close one at a time at spaced time intervals when the transmitting contact remains in its last-operated position, a series of circuits each including a selected one of said timing contacts, one or more of said circuits also including a contact controlled by said code-sending relay, and means responsive to the closing of each circuit of said series for operating said transmitting contact.

32. Code transmitting apparatus for delivering to a line circuit a plurality of different multiple element codes each characterized by the time spacing of its successive code elements, a transmitting contact included in said line circuit, a plurality of code-sending relays including one for each code, means effective when any code-sending relay is operated to cause an initial operation of said contact, two series of timing contacts, the contacts of one series or the other being arranged to close one at a time at spaced time intervals when the transmitting contact remains in its last-operated position, a plurality of series of circuits each including a selected one of said contacts, one or more circuits of each series also including a contact of a particular code-sending relay, means responsive to the closing of each circuit of a series for operating said transmitting contact, and means responsive to each operation of said transmitter for selecting the next circuit of the same series for operation.

33. In a centralized traffic control system for railroads, two stations connected by a line circuit, means at one station for delivering to the line circuit a series of code elements, means for prolonging selected ones of said elements for relatively short or long time intervals, and means at the other station selectively responsive to said series of code elements, the operation of said means depending upon which elements are prolonged and upon the relative length of time that the selected elements are prolonged.

34. In a centralized traffic control system for railroads, an office and a plurality of stations connected by a line circuit, means at the office for delivering to the line circuit different series of code elements, means for prolonging selected elements of each series for relatively short or long time intervals, and means at each station selectively responsive to a particular series of such code elements.

35. In a centralized traffic control system for railroads, two spaced stations connected by a line circuit, a three-position movable device, a code transmitter at one station for opening and closing said line circuit repeatedly to produce a series of code elements in which a selected element is relatively short provided said device is in its first position, means setting the code transmitter into operation when said device is moved from any one of its three positions to another of said positions, means for prolonging said selected element for a relatively short time interval when the device has been moved to its second position, means for prolonging said element for a relatively long time interval when the device is moved to its third position, and code receiving means at the other station selectively responsive to each said series of code elements.

36. In a centralized traffic control system for railroads, an office and a station connected by a line circuit, a movable lever at the office capable of assuming any one of three positions, a code transmitter at the office for opening and closing said line circuit repeatedly to produce a series of code elements in which a selected element is relatively short if said lever is in one position, means setting the code transmitter into operation when said lever is moved from any position to another position, means prolonging said selected element for a relatively short time interval if the lever has been moved to its second position, means prolonging said selected element for a relatively long time interval if the lever has been moved to its third position, code receiving means at the station selectively responsive to said series of code elements, a traffic controlling device at said station, and means controlled by said code receiving means and selectively responsive to the relative length of said selected element to place said traffic controlling device in a condition corresponding to the position to which the lever is moved.

37. Code transmitting apparatus comprising a normally closed line circuit connecting a plurality of stations, a line relay and a transmitting contact at each station included in said line circuit, a stick relay at each station effective when energized to cause the associated transmitting contact to operate repeatedly to deliver a code comprising a series of time-spaced impulses characteristic of the station to said line circuit, a pickup circuit for energizing each stick relay to initiate such code including a contact closed only when the associated line relay has been energized for a predetermined time interval, a first holding circuit for each stick relay including its own front contact and a contact which closes when the associated transmitting contact opens, a second holding circuit for each stick relay which closes when the first holding circuit is opened by the operation of said transmitting contact provided the associated line relay becomes energized, and other means for releasing such stick relay when the code delivered by the associated transmitting contact is completed.

38. Apparatus for the remote control of a movable device comprising a two-position manually operable lever, a two-position relay adapted to remain in its last-operated position when deenergized, a starting relay, a storing relay, a sending relay, means operating the starting relay when the lever is moved to a position out of correspondence with that of the two-position relay, means responsive to the operation of the starting relay for energizing the storing relay, means controlled by the storing relay when energized to operate the two-position relay to a position corresponding to that of the lever and to thereby restore the starting relay to its normal condition, means effective when the starting relay assumed its normal condition and the storing relay is energized for energizing the sending relay, means rendered effective upon energization of the sending relay to control said device to a position corresponding to that of said two-position relay and to also restore the storing and sending relays to their normal condition.

39. Apparatus for the remote control of a movable device comprising a two-position manually operable lever, a two-position relay adapted to remain in its last-operated position when deenergized, a second relay, means causing said second relay to assume an abnormal condition whenever said lever and two-position relay are out of correspondence, and means rendered effective upon the return of said second relay to its normal condition for operating said device to a position corresponding to that of said two-position relay.

40. Apparatus for the remote control of a movable device comprising a two-position manually operable lever, a two-position relay adapted to remain in its last-operated position when deenergized, circuits for operating said relay to a position corresponding to that of the lever effective only when conditions are favorable for the operation of said device, means effective when the lever and relay occupy corresponding positions for operating said device to a position corresponding to that of the relay, an indicator associated with said lever, and means causing said indicator to give one distinctive indication when the device and the relay are out of correspondence and another distinctive indication when the lever and the relay are out of correspondence.

41. Apparatus for the remote control of a movable device comprising a two-position manually operable lever, a two-position relay adapted to remain in its last-operated position when deenergized, circuits for operating said relay to a position corresponding to that of the lever effective only when conditions are favorable for the operation of said device, means effective when the lever and relay occupy corresponding positions for operating said device to a position corresponding to that of the relay, a single indication lamp associated with said lever, and means causing said lamp to be steadily lighted when the device and the relay are out of correspondence and to be intermittently lighted when the lever and the relay are out of correspondence.

42. Apparatus for the remote control of two conflicting traffic governing devices comprising a two-position relay adapted to remain in its last-operated position when deenergized, a three-position manually operable lever having two extreme positions corresponding to the two positions of said relay and also having an intermediate position, means causing both said traffic governing devices to assume a non-conflicting condition when the lever is moved to its intermediate position, means for operating said relay, and means effective when the relay and the lever occupy corresponding positions to control one said device or the other depending upon the position of said relay.

43. Apparatus for the remote control of two conflicting traffic governing devices comprising a two-position relay adapted to remain in its last-operated position when deenergized, a three-position manually operable lever having two extreme positions corresponding to the two positions of said relay and also having an intermediate position, means causing both said traffic governing devices to assume a non-conflicting condition when the lever is moved to its intermediate position, means effective only when both said devices have assumed a non-conflicting condition and said lever is moved to one extreme position or the other to cause said relay to move to the corresponding position, and means rendered effective when the relay and the lever occupy corresponding positions to control one said device or the other depending upon the position of said relay.

44. Apparatus for the control of a pair of opposing railway signals comprising a two-position relay adapted to remain in its last-operated position when deenergized, a three-position manually operable lever having two extreme positions corresponding to the two positions of said relay and also having an intermediate position, means causing both said signals to assume the stop position when the lever is moved to its intermediate position, means effective only when both said signals are at stop, and the lever is moved to an extreme position to cause the relay to move to a corresponding position, and means for clearing one signal or the other depending upon the position of said relay and effective only when the relay and lever occupy corresponding positions.

45. A remote indication system for railroads comprising a plurality of two-position indication relays each adapted to remain in its last-operated position when deenergized, remote control means for selectively operating said relays to one position or to the other, means controlled by each relay for visually indicating when it occupies its one position, a normally energized neutral relay, means deenergizing said neutral relay when any of said indication relays is operated to its one position but not when it is operated to its other position, and means for audibly indicating when said neutral relay becomes deenergized.

46. A remote indication system for railroads comprising a plurality of two-position indication relays each adapted to remain in its last-operated position when deenergized, remote control means for selectively operating said relays to one position or to the other, means controlled by each relay for visually indicating when it occupies its one position, a stick relay, normally closed pickup and stick circuits for said relay, means controlled by the remote control means for opening said pickup circuit when any of said indication relays is being operated to its one position, means controlled by each indication relay for opening said stick circuit when such relay is being operated to either position, and means for audibly indicating when said stick relay becomes deenergized.

47. A remote indication system for railroads comprising a plurality of two-position indication relays each adapted to remain in its last-operated position when deenergized, a selector relay for each indication relay, two register relays, means for selectively operating each indication relay to its one position when the corresponding selector relay and one register relay are energized and to its other position when such selector relay and the other register relay are energized, remote control means for selectively operating said selector relays and said register relays, means controlled by each indication relay for visually indicating when it occupies its one position, a stick relay, a pickup circuit for said stick relay including a back contact of said one register relay, a stick circuit for said stick relay including its own front contact and in series, a contact of each of said indication relays, each such contact being arranged to open momentarily when the indication relay is operated to either position, and means for audibly indicating when said stick relay becomes deenergized.

48. In a remote control system, two stations at spaced points connected by a line circuit, transmitting means at one station for delivering a code to said line circuit, a starting relay, a stick relay, a pickup circuit for the stick relay including a front contact of the starting relay, a stick circuit for the stick relay, means for energizing the starting relay, means rendered effective upon the energization of the stick relay to release the starting relay, means effective when the starting relay is released and the stick relay is energized to cause said transmitting means to deliver a code to said line circuit, and means releasing said stick relay at the end of a complete code.

49. In a remote control system, two stations at spaced points connected by a line circuit, transmitting means at one station for delivering a code to said line circuit, a starting relay, a stick relay, a pickup circuit for the stick relay including a front contact of the starting relay, a stick circuit for the stick relay, means for energizing the starting relay, means rendered effective upon the energization of the stick relay to release the starting relay, means effective when the starting relay is released and the stick relay is energized to cause said transmitting means to deliver a code to said line circuit, and means controlled by said transmitting means for releasing said stick relay.

50. In a remote control system, two stations at spaced points connected by a line circuit, transmitting means at one station for delivering a code to said line circuit, a starting relay, a stick relay, a pickup circuit for the stick relay including a front contact of the starting relay, a stick circuit for the stick relay, means for energizing the starting relay, means rendered effective upon the energization of the stick relay to release the starting relay, means effective when the starting relay is released and the stick relay is energized to cause said transmitting means to deliver a code to said line circuit, means effective if the operation of said transmitting means is interrupted before the code is completed to release said stick relay, and other means effective at the end of a complete code to release said stick relay.

51. Remote control apparatus comprising a movable device capable of assuming two positions, a two-position relay having an armature normally occupying a position in agreement with said device, a line circuit, a starting relay, means actuating the starting relay when the device is moved out of agreement with said armature, means controlled by the starting relay when actuated for energizing said two-position relay to restore its armature to a position in agreement with said device, means controlled by the starting relay and rendered effective when said armature assumes a position in agreement with said device to transmit a code signal over said line circuit, and mechanism controlled by said code signal in accordance with the position of said armature.

52. In combination with a track switch and a signal for governing the movement of traffic over the switch, code transmitting means at a remote office for selectively operating the switch and the signal, a locking relay controlled by the signal and effective when deenergized to prevent operation of the switch, and code-controlled indication means controlled by said locking relay for governing the operation of said code transmitting means.

53. In combination with a track switch and a signal for governing the movement of traffic over the switch, code transmitting means at a remote office for selectively operating the switch and the signal, a locking relay controlled by the signal and effective when deenergized to prevent operation of the switch, a two-position indication relay, means operating said indication relay to one position when the code-transmitting means is operated to clear the signal, code-controlled means operating said indication relay to its other position when the signal has been put to stop and said locking relay is energized, and means for at times preventing the operation of said code transmitting means unless said indication relay is in said other position.

54. In combination with a stretch of railway track over which traffic moves in either direction, two signals for governing the movement of traffic in opposite directions over the stretch, code transmitting means at a remote office including a traffic-direction relay and operable to clear one signal or the other in accordance with the position of said relay or to restore such signal to stop, a locking relay controlled by each signal and arranged to be energized only when such signal indicates stop, a two-position indication relay, means operating said indication relay to one position when the code transmitting means is operated to clear either signal, means operating said indication relay to its other position when such signal has been put to stop and said locking relays are energized, and means effective only when said indication relay is in said other position to operate said traffic direction relay for reversing the direction of traffic in said stretch.

55. In combination with a section of railway track, a track relay for said section, a plurality of signals for governing the movement of traffic into said section, a line circuit, a plurality of two-position relays each adapted to remain in its last-operated position when deenergized, means governed over said line circuit for operating said two-position relays to different positions to selectively clear one or another of said signals or to cause all of said signals to indicate stop, and means momentarily effective when said track relay becomes released to operate said two-position relays to a position to cause all of said signals to indicate stop.

56. In combination with a section of railway track, a track relay for said section, a signal for governing the movement of traffic into said section, a two-position relay adapted to remain in its last-operated position when deenergized and effective in one position to cause the signal to clear and in its other position to cause the signal to indicate stop, manually operable means controlled from a point remote from said section for operating the two-position relay to either position, and means momentarily effective when said track relay becomes released to operate the two-position relay to a position to cause the signal to indicate stop.

57. In combination with a section of railway track, a track relay for said section, a signal for governing the movement of traffic into said section, a two-position relay adapted to remain in its last-operated position when deenergized for controlling the signal, manually operable means at a point remote from said section effective when moved to one position to operate the two-position relay to a position to cause the signal to clear and effective when moved to another position to operate the two-position relay to a position to cause the signal to indicate stop, means momentarily effective when said track relay becomes released to operate the two-position relay to a position to cause the signal to indicate stop, and means rendered effective when said track relay becomes energized to operate said two-position relay to a position to cause the signal to clear provided said manually operable means is then in said one position.

58. In combination with a section of railway track, a track relay for said section, a signal for governing the movement of traffic into said section, a two-position control lever at a point remote from the signal, code-controlled means effective when operated to cause the signal to clear, means operating said code-controlled means in response to a movement of said lever to one position, means responsive to the release of said track relay to restore the signal to stop, a manually operable key associated with said control lever operable only when the lever has been moved to said one position, and means effective when said key is operated to cause the code-controlled means to be operated automatically in response to the re-energization of said track relay.

59. In combination, a two-position track switch and a signal governing the movement of traffic over the switch, code-transmitting means for operating the switch and for clearing the signal, a switch control lever and a signal control lever, a two-position relay, means effective when the switch lever is moved to operate said relay to a corresponding position and to then initiate the operation of said code-transmitting means for operating the switch to a position in agreement with that of said relay, means effective when the signal lever is moved to initiate the operation of said code-transmitting means to control the signal, and means preventing the operation of said code-transmitting means for clearing the signal unless the switch lever and relay occupy corresponding positions and the indicated position of the switch is in agreement with the position of said relay.

60. In combination with code-transmitting apparatus effective when operated to send switch and signal control messages from a control office to a remote station adjacent a stretch of railway track including a track switch, signals for governing the movement of traffic into said stretch, a switch lever and a signal lever at said office, means for controlling said switch and signals by the operation of said apparatus in response to the movement of said levers, interlocked circuits located at the office and including a route circuit for each signal which when open prevents the clearing of such signal in response to the movement of the signal lever and also including a locking circuit which when open prevents the operation of the switch in response to the movement of said switch lever, means controlled by the signals and by traffic conditions in said stretch for controlling said locking circuit, and means controlled by the signals and by the track switch for controlling said route circuits.

61. In combination with code-transmitting apparatus effective when operated to send signal control messages from a control office to remote stations located at spaced points along a stretch of railway track, a signal at each station for governing the movement of traffic in said stretch, a plurality of movable signal control levers at said office including one for each signal, means for controlling each of said signals by the operation of said apparatus in response to a movement of the corresponding lever, interlocked circuits located at the office and including a route circuit for each signal which when open prevents the clearing of such signal by operation of said apparatus, and means controlling each such route circuit in accordance with traffic conditions at the next station in advance in the traffic direction governed by the corresponding signal.

62. Code-transmitting apparatus comprising a normally closed line circuit connecting a plurality of stations, a line relay and a transmitting relay at each station the winding of each line relay and a contact of each transmitting relay being included in said line circuit, a stick relay at each station effective when energized to cause the associated transmitting relay to operate repeatedly to deliver a code comprising a series of time-spaced impulses characteristic of the station to said line circuit, means associated with each stick relay for energizing it to initiate such code, a holding circuit for each stick relay, means including cooperating contacts of the associated line relay and transmitting relay for opening such circuit to release the stick relay during the code provided the line relay fails to pick up when the transmitting relay closes its line contact or if it releases while its line contact is closed, and other means for releasing said stick relay at the end of the code.

63. In a remote control system, an office and a plurality of stations connected by a line circuit, a transmitter relay at each station for opening and closing the line circuit, means at each station for operating such transmitter relay repeatedly to transmit a code characteristic of the station to said office, and means effective in the event a plurality of transmitter relays are set into operation at the same time to discontinue the operation of all but one of such relays comprising a line relay at each station responsive to the codes delivered to said line circuit, and a circuit governing the operation of each transmitter relay including cooperating contacts of such relay and of the associated line relay.

64. In a remote control system, an office and a plurality of stations connected by a line circuit, a transmitter relay at each station for opening and closing the line circuit, means at each station for operating such transmitter relay repeatedly to transmit a code characteristic of the station to said office, and means effective in the event a plurality of transmitter relays are set into operation at the same time to discontinue the operation of all but one of such relays comprising a line relay at each station responsive to the codes delivered to said line circuit, a circuit governing the operation of each transmitter relay including cooperating contacts of the transmitter relay and of the associated line relay, said circuit being arranged to be opened on any step of the code to discontinue the operation of such transmitter relay unless the transmitter relay and the line relay are operated in accordance with the same code.

65. In a remote control system, an office and a plurality of stations connected by a line circuit, a transmitter relay at each station for opening and closing the line circuit, means at each station for operating such transmitter relay repeatedly to transmit a code characteristic of the station to said office, means effective in the event a plurality of transmitter relays are set into operation at the same time to discontinue the operation of all but one of such relays comprising a line relay at each station responsive to the codes delivered to said line circuit, a circuit associated with each transmitter relay including contacts of that relay and of the associated line relay, and means opening such circuit to discontinue the operation of the transmitter relay in the event that the response of the associated line relay on any step of the code is not in accordance with the code operation of such transmitter relay.

66. In a remote control system, an office and a plurality of stations connected by a line circuit, a transmitter relay at each station for opening and closing the line circuit, a stick relay at each station, means controlled by each stick relay when energized for operating the associated transmitter relay repeatedly to transmit a code characteristic of the station to the office, means for energizing each stick relay to initiate a code effective only when said line circuit is steadily closed, means effective in the event that a plurality of stick relays become energized at the same time to release all but one of such relays comprising a line relay at each station responsive to the codes delivered to said line circuit, and a holding circuit for each stick relay including cooperating contacts of the associated line relay and transmitter relay which opens to release the stick relay unless the associated line relay and transmitter relay are operated in accordance with the same code.

67. In a remote control system, an office and a plurality of stations connected by a line circuit, a transmitter relay at each station for opening and closing the line circuit, a stick relay at each station, means controlled by each stick relay when energized for operating the associated transmitter relay repeatedly to transmit a code characteristic of the station to the office, means for energizing each stick relay to initiate a code effective only when said line circuit is steadily closed, means effective in the event that a plurality of stick relays become energized at the same time to release all but one of such relays comprising a line relay at each station responsive to the codes delivered to said line circuit, and a holding circuit for each stick relay including cooperating contacts of the associated line relay and transmitter relay which opens to release the stick relay in the event the transmitter relay is operated to close the line circuit and the associated line relay fails to respond or in the event the line relay releases while the associated transmitter relay is positioned to close the line circuit.

68. In a remote control system, an office and a plurality of stations connected by a line circuit, a transmitter relay at each station for controlling said line circuit, independently operable means for initiating the operation of each transmitter relay to deliver a code to said line circuit, each code comprising a series of relatively short and long impulses and intervals arranged in a pattern characteristic of the station, a line relay at each station responsive to each code delivered to the line circuit, a circuit for maintaining each transmitter relay in operation to complete its code including in series a contact of the transmitter relay and of the associated line relay, and means governed by said circuit to discontinue the operation of such transmitter relay on any step of the code provided it is operated to deliver a short interval to the line circuit and the associated line relay responds to a long interval or if it is operated to deliver a long impulse to the line circuit and the associated line relay responds to a short impulse.

69. Apparatus for the remote control of a railway track switch comprising a two-position manually operable lever, a two-position switch control relay controlled by said lever, means controlled by said relay for operating the switch to a corresponding position, locking means for at times preventing the operation of said relay in response to a movement of said lever, a normally deenergized indication lamp associated with said lever, means causing said lamp to be lighted intermittently in response to a movement of said lever as long as said locking means is effective, means causing said lamp to become steadily lighted when said relay operates in response to a movement of said lever, and means causing said lamp to become extinguished in response to a movement of the track switch to a position corresponding to that to which the lever has been moved.

70. In combination with a track switch and a signal for governing the movement of traffic over the switch, remote control means for operating the switch and the signal, a locking relay controlled by the signal and effective when deenergized to prevent operation of the switch, a single indication lamp adapted to be steadily lighted at times to indicate the condition of the switch, and means causing said lamp to be lighted intermittently when the switch control means is operated as long as said locking relay is deenergized.

71. Apparatus for the remote control of a railway signal for governing the movement of traffic over a track switch comprising a manually operable signal lever, a signal control relay controlled by said lever for clearing the signal, locking means controlled by the track switch effective at times to prevent the operation of said relay to thereby prevent the clearing of the signal in response to a movement of said lever, a normally deenergized indication lamp associated with said lever, means causing said lamp to be lighted intermittently in response to a movement of the lever for clearing the signal as long as said locking means is effective, and means controlled by the signal for causing said lamp to become steadily lighted when the signal indicates clear.

72. In combination with a stretch of railway track over which traffic moves in either direction, two signals for governing the movement of traffic in opposite directions over the stretch, remote control means for each signal for clearing such signal or for causing it to indicate stop, a locking relay controlled by each signal and arranged to be energized only when such signal indicates stop, a normally deenergized indication lamp associated with the control means for each signal, means causing each indication lamp to be steadily lighted when the corresponding signal is cleared, and means causing such indication lamp to be lighted intermittently when the remote control means is operated to clear the corresponding signal as long as the locking relay controlled by the opposing signal is deenergized.

73. In combination with a track switch and a signal for governing the movement of traffic over the switch, remote control means for operating the switch and the signal, indication means controlled by the switch for governing the signal in accordance with the position of the switch, a single indication lamp adapted to be steadily lighted at times to indicate the condition of the signal, and means causing said lamp to be lighted intermittently when the signal control means is operated to clear the signal, provided the position of the switch as reflected by the switch indication means is such as to prevent the signal from clearing.

74. In combination, a two-position track switch and a signal governing the movement of traffic over the switch, remote control means for operating the switch and for clearing the signal in accordance with the position of the switch, a switch indication lamp adapted to be steadily lighted at times to indicate the condition of the switch, a signal indication lamp adapted to be steadily lighted at times to indicate the condition of the signal, means causing the switch indication lamp to be lighted intermittently if the switch control means is operated when the signal control means has been conditioned to clear the signal, and means causing the signal indication lamp to be lighted intermittently if the signal control means is operated to clear the signal provided the condition of the track switch or of its control means is such as to prevent said signal from clearing.

75. In combination, a track switch and a signal for governing traffic movements over the switch, remote control means for operating the switch, a code transmitter at a remote point for selectively clearing the signal, signal control means for operating said code transmitter to clear the signal, means effective unless the switch and its control means are in corresponding positions to prevent the operation of the code transmitter in response to the operation of the signal control means, an indication lamp associated with said signal control means arranged to be steadily lighted at times to indicate the condition of the signal, and means causing said lamp to be lighted intermittently when said signal control means is operated as long as said code transmitter is prevented from operating.

76. In an interlocking system for railroads, a track layout including a plurality of track switches and signals for governing the movement of traffic over different routes through the layout, operating means for controlling the switches and signals comprising a plurality of relays having electrically interlocked circuits controlled by said switches and signals and arranged to prevent the clearing of a signal except when the route that such signal governs is available and to prevent the operation of a switch when a signal for governing traffic over the switch has been cleared, control means for controlling said operating means located at a control office and comprising a plurality of relays having interlocked circuits controlled by said switches and signals and arranged to prevent the operation of any control means except when the corresponding operating means is free to operate, a plurality of freely operable manual control levers for governing said control means, a plurality of indication lamps including at least one for each lever arranged to be lighted steadily at times to indicate the condition of the switch, a signal controlled by such lever, and means governed by said control means for causing each said lamp to be lighted intermittently when the corresponding lever is moved provided the condition of the interlocked control means is such as to prevent its response to said lever movement.

77. In combination with code-transmitting apparatus for transmitting different code signals to a remote point, a railway signal located at said remote point, a signal lever effective when operated to cause said apparatus to transmit a code for conditioning the signal to indicate proceed or stop in accordance with the position to which said lever is moved, locking means for preventing the clearing of said signal unless a route which it governs is available, indication means governed by said locking means, means controlled by said indication means for at times locking said code-transmitting apparatus to prevent its operation in response to a lever movement for clearing the signal unless a route is available, and means governed by said indication means for distinctively indicating the non-response of said code-transmitting apparatus.

78. In combination with code-transmitting apparatus for transmitting different code signals to a remote point, a railway track switch located at said remote point, a signal for governing the movement of traffic over the switch, a switch lever effective when operated to cause said apparatus to transmit a code for operating the switch to one position or another in accordance with the position to which said lever is moved, a signal lever effective when operated to cause said apparatus to transmit a code for conditioning the signal to indicate proceed or stop in accordance with the position to which said signal lever is moved, locking means controlled by the signal for at times preventing operation of the switch, indication means controlled by said locking means, means controlled by said indication means for locking said code-transmitting apparatus to prevent its operation in response to a switch lever movement when the switch is locked against operation, and means governed by said indication means for distinctively indicating the non-response of said code-transmitting apparatus to such lever movement.

79. In combination with a plurality of controlled devices, a plurality of movable levers for controlling said devices including one for each device, an indication lamp for each device arranged to be steadily lighted at times to indicate the condition of such device, interlocking means for preventing the operation of said devices in response to the movements of their respective levers unless the lever movements are made in a predetermined order, and means for causing each indication lamp to be lighted intermittently when the corresponding lever is moved and the device controlled by such lever is locked against operation by said interlocking means.

80. In a centralized traffic control system for railroads, code-transmitting apparatus for transmitting different code signals to a remote point, a main signal and an auxiliary call-on signal at said remote point, a signal lever effective when operated to cause said apparatus to transmit a code for conditioning the main signal to indicate clear or stop in accordance with the position to which said lever is moved, a manually operable call-on key, means responsive to a momentary operation of said key to cause the apparatus to transmit a code to cause said auxiliary signal to be cleared in the event that said main signal fails to clear, means preventing the transmission of a code in response to the operation of said key unless said signal lever has been operated to condition the main signal to indicate clear, and means responsive to a code for conditioning the main signal to stop for causing said auxiliary signal to indicate stop.

81. In a centralized traffic control system for railroads, code-transmitting apparatus for transmitting different code signals to a remote point, a main signal and an auxiliary call-on signal at said remote point, a signal lever, means for causing said apparatus to transmit a code for conditioning the main signal to clear or stop in accordance with the position of said signal lever, a lever repeating relay which becomes energized when said apparatus is operated to transmit a code to clear the main signal, and means effective only if said lever relay is energized for causing said apparatus to transmit a code for clearing said call-on signal in the event the main signal fails to clear.

82. In a remote control system, an office and a plurality of stations connected by a line circuit, a code transmitter at the office adapted to transmit multiple element codes over said line circuit to said stations, a code transmitter at each station adapted to transmit a multiple element code characteristic of the station over said line circuit to the office, independent means for setting said code transmitters into operation, and means effective in the event a plurality of said transmitters are set into operation at the same time to discontinue the operation of all but one, comprising means for discontinuing the operation of each station transmitter on any step of the code in response to the delivery to said line circuit of a code element which is not in accordance with the code which such transmitter is adapted to transmit.

83. In a remote control system, an office and a plurality of stations connected by a normally closed line circuit, a code transmitter at the office and at each station for controlling said line circuit, stepping apparatus at each station for operating the transmitter at that station to deliver a multiple element code to said line circuit, each such code being different from the others in the character of at least one element, means for selectively operating the office transmitter to deliver any one of a plurality of different codes to said line circuit which differ from the codes delivered by the stations only in the character of the first element, a line relay at the office and at each station responsive to codes delivered to said line circuit, independent means for setting said code transmitters into operation, and means effective in the event a plurality of said transmitters are set into operation at the same time to discontinue the operation of all but one, comprising means controlled by each station line relay for discontinuing the operation of the transmitter at that station on any step of a code provided the operation of such line relay on that step is not in accordance with the code then being delivered by the associated transmitter.

84. In a remote control system, an office and a plurality of stations connected by a line circuit, a code transmitter at each station for controlling said line circuit, stepping apparatus at each station for operating the transmitter at that station to deliver a multiple element code to the line circuit in which the lengths of the line-open and the line-closed periods are both regulated, each such code being different from the others in the length of at least one element, code receiving means at the office responsive to the codes delivered to said line circuit, independent means for setting said code transmitters into operation, and means effective in the event a plurality of said transmitters are set into operation at the same time to discontinue the operation of all but one, comprising means for discontinuing the operation of each transmitter on any step of the code in response to the delivery of a long line-open element or a short line-closed element to said line circuit provided such element is not in accordance with the code which said transmitter is transmitting.

85. In a remote control system, an office and a plurality of stations connected by a line circuit, a code transmitter at the office and at each station for controlling said line circuit, a stick relay at the office and at each station, means effective when each stick relay is energized to operate the associated transmitter to deliver a multiple element code of time spaced elements to the line circuit, each such code being different from the others in the length of at least one element, code receiving means at the office and at each station responsive to the codes delivered to the line circuit, independently operable means for picking up said stick relays, means for releasing each energized stick relay at the end of a complete code, and means effective in the event a plurality of said transmitters are set into operation at the same time to discontinue the operation of all but one comprising means for releasing each station stick relay on any step of a code in response to the delivery to said line circuit of a code element which is not in accordance with the code then being transmitted by the code transmitter which such stick relay controls.

86. In combination with a track switch, code transmitting means at a remote office for selectively operating said switch, locking means at said office for at times preventing operation of said code transmitting means, a locking relay adjacent the switch effective when deenergized to prevent operation of the switch, and code controlled indication means controlled by said locking relay for releasing said locking means to permit the operation of said code transmitting means when said locking relay becomes energized.

87. A remote control system for transmitting distinctive control messages from an office to a station comprising a plurality of control levers at said office each having two control positions, a two-position relay associated with each lever which normally occupies a position corresponding to that of the lever, locking means associated with each lever, means effective when any lever is moved from one position to another provided the associated locking means is released to operate the associated relay to a corresponding position, code controlled indication means controlled by conditions at said station for at times releasing said locking means, and means effective only when a lever and the associated relay occupy corresponding positions for transmitting a code message having characteristics identifying said lever and other characteristics determined by the position of the associated relay.

88. Code transmitting apparatus comprising a normally closed line circuit connecting a plurality of stations, a line relay and a transmitting contact at each station included in said line circuit, a stick relay at each station effective when energized to permit the associated transmitting contact to be operated repeatedly to determine the character of a code comprising a series of time-spaced impulses characteristic of the station impressed upon said line circuit, a pick-up circuit for energizing each stick relay to initiate each code including a contact closed only when the associated line relay has been energized for a predetermined time interval, a first holding circuit for each stick relay including its own front contact and a contact which closes when the associated transmitting contact opens, a second holding circuit for each stick relay which closes when the first holding circuit is opened by the operation of said transmitting contact provided the associated line relay becomes energized, and other means for releasing such stick relay when the code delivered by the associated transmitting contact is completed.

CLARENCE S. SNAVELY.
ALFRED B. MILLER.
ARTHUR P. JACKEL.